United States Patent
Chung et al.

(10) Patent No.: US 11,527,191 B2
(45) Date of Patent: Dec. 13, 2022

(54) DISPLAY DRIVER CIRCUIT AND METHOD FOR REDUCING INFLUENCE OF NOISE OR DITHER

(71) Applicant: Samsung Electronics Co., Ltd., Suwon-si (KR)

(72) Inventors: Hojun Chung, Seoul (KR); Hongki Kwon, Seongnam-si (KR); TaeWoo Kim, Hwaseong-si (KR); Jinyong Park, Suwon-si (KR); Jaeyoul Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 398 days.

(21) Appl. No.: 16/866,930

(22) Filed: May 5, 2020

(65) Prior Publication Data
US 2020/0265770 A1     Aug. 20, 2020

Related U.S. Application Data

(63) Continuation of application No. 16/257,420, filed on Jan. 25, 2019.

(30) Foreign Application Priority Data

Jun. 15, 2018   (KR) .................. 10-2018-0069241

(51) Int. Cl.
*H04N 19/176*  (2014.01)
*G09G 3/20*    (2006.01)
*H04N 19/182*  (2014.01)

(52) U.S. Cl.
CPC ......... *G09G 3/2074* (2013.01); *G09G 3/2003* (2013.01); *H04N 19/176* (2014.11); *H04N 19/182* (2014.11); *G09G 2320/0247* (2013.01)

(58) Field of Classification Search
CPC .. H04N 19/176; H04N 19/182; G09G 3/2074; G09G 3/2003; G09G 230/0247
(Continued)

(56) References Cited

U.S. PATENT DOCUMENTS

5,764,296 A    6/1998  Shin
7,991,238 B2   8/2011  Malvar et al.
(Continued)

FOREIGN PATENT DOCUMENTS

KR    10-2015-0081397 A    7/2015

OTHER PUBLICATIONS

US 8,712,782 B2, 04/2014, Son et al. (withdrawn)

*Primary Examiner* — Trang U Tran
(74) *Attorney, Agent, or Firm* — Muir Patent Law, PLLC

(57) ABSTRACT

The present invention provides a display driver circuit. A determination circuit is configured to select a first mode for encoding first image data based on a first set of conditions respectively corresponding to a first set of modes. An encoder is configured to encode the first image data in the first mode. The determination circuit is additionally configured to select a second mode for encoding second image data received (n−1)th after the first image data are received; and to select a third mode for encoding third image data received (n)th after the first image data are received, based on a second set of conditions respectively corresponding to the first set of modes. A second condition in the second set of the conditions corresponding to the second mode includes a wider range of values than a first condition in the first set of the conditions corresponding to the second mode.

17 Claims, 13 Drawing Sheets

(58) Field of Classification Search
USPC .......................................................... 345/204
See application file for complete search history.

(56) References Cited

U.S. PATENT DOCUMENTS

| | | | |
|---|---|---|---|
| 8,422,546 B2 | 4/2013 | Lin et al. | |
| 8,457,198 B2 | 6/2013 | Baik | |
| 8,749,620 B1 | 6/2014 | Knight et al. | |
| 9,210,441 B2 | 12/2015 | Yin et al. | |
| 9,350,994 B2 | 5/2016 | Bhaumik et al. | |
| 9,491,432 B2 | 11/2016 | Lin et al. | |
| 9,560,371 B2 | 1/2017 | Johnson et al. | |
| 10,542,293 B2* | 1/2020 | Chono | H04N 19/13 |
| 2006/0072023 A1 | 4/2006 | Kurosawa et al. | |
| 2007/0171242 A1 | 7/2007 | Chung | |
| 2008/0095242 A1 | 4/2008 | Lim et al. | |
| 2008/0143877 A1 | 6/2008 | Urabe et al. | |
| 2009/0085896 A1 | 4/2009 | Nagase et al. | |
| 2011/0090309 A1 | 4/2011 | Suzuki et al. | |
| 2011/0280543 A1 | 11/2011 | Uchida et al. | |
| 2012/0236183 A1 | 9/2012 | Hiramatsu et al. | |
| 2013/0077684 A1* | 3/2013 | Chen | H04N 19/70 375/240.13 |
| 2013/0188016 A1 | 7/2013 | Tsukagoshi et al. | |
| 2014/0035798 A1 | 2/2014 | Kawada et al. | |
| 2015/0195581 A1 | 7/2015 | Lee et al. | |
| 2015/0304674 A1* | 10/2015 | Lee | H04N 19/184 382/232 |
| 2015/0339965 A1 | 11/2015 | Harada et al. | |
| 2016/0014420 A1 | 1/2016 | Su et al. | |
| 2017/0091029 A1 | 3/2017 | Cho | |
| 2017/0200406 A1 | 7/2017 | Lin et al. | |
| 2017/0272759 A1* | 9/2017 | Seregin | H04N 19/593 |
| 2017/0272782 A1* | 9/2017 | Li | H04N 19/46 |
| 2018/0048914 A1 | 2/2018 | Cho et al. | |
| 2018/0139444 A1 | 5/2018 | Huang et al. | |
| 2018/0332288 A1* | 11/2018 | Hsiang | H04N 19/70 |
| 2019/0075327 A1 | 3/2019 | Chono | |

* cited by examiner

FIG. 10

| Mode | Conditions(c0) | Conditions(c1) |
|---|---|---|
| m1 | 0 =< cv0 < 10 | 0 =< cv1 < 5 |
| m2 | 10 =< cv0 < 20 | 5 =< cv1 < 25 |
| m3 | 20 =< cv0 < 30 | 25 =< cv1 < 35 |
| ⋮ | ⋮ | ⋮ |
| m4 | 50 =< cv0 < 60 | 55 =< cv1 < 65 |
| m5 | 60 =< cv0 < 70 | 65 =< cv1 < 70 |

FIG. 11

| Frame No. | Pixel Value (Red) | Pixel Value (Green) | Pixel Value (Blue) | Conversion Value |
|---|---|---|---|---|
| (N-1)th | 90 | 100 | 102 | 12 |
| (N)th | 90 | 100 | 101 | 11 |
| (N)th' | 90 | 100 | 98 | 8 |

DISPLAY DRIVER CIRCUIT AND METHOD FOR REDUCING INFLUENCE OF NOISE OR DITHER

CROSS-REFERENCE TO RELATED APPLICATIONS

This application is a continuation application of and claims priority to U.S. patent application Ser. No. 16/257,420, filed Jan. 25, 2019, which claims priority under 35 U.S.C. § 119 to Korean Patent Application No. 10-2018-0069241 filed on Jun. 15, 2018, in the Korean Intellectual Property Office, the disclosures of each of which are incorporated by reference herein in their entireties.

TECHNICAL FIELD

Example embodiments of the inventive concept relate to an electronic circuit, and more particularly, to a display driver circuit and a method to drive a display panel.

BACKGROUND

With regard to a display device, the demand on high-definition images such as a high-definition (HD) image and an ultra-high definition (UHD) image is increasing. As the resolution of a display panel increases from a high-definition (HD) level to an ultra-high definition (UHD) level, the amount of image data including information of an image to be displayed on the display panel increases.

As the amount of the image data increases, the size of a memory storing the image data is sharply increasing. Reduction of the size of the memory is desired to secure the competitiveness with regard to the size of a chip including the memory. Accordingly, in an image processing process of displaying an image on the display panel by using the image data, the image data may be encoded to decrease the amount of the image data.

Noise or dither occurring in the image processing process may cause an error in which information included in the image data experiences an unintended change. The error arising from the image data may be amplified in the process of encoding the image data. The amplified error may cause fine dithering and blinking of an image displayed on the display panel. This phenomenon is referred to as a "flicker". The flicker may make user's eyes tired or concentration of the user low, making the user feel dizzy.

SUMMARY

Embodiments of the inventive concept provide a display driver circuit and a method for decreasing a flicker due to noise or dither.

According to some embodiments, a display driver circuit includes an encoding mode determination circuit and an encoder. The encoding mode determination circuit is configured to select a first encoding mode for encoding first image data based on a first set of conditions respectively corresponding to a first set of encoding modes. The encoder is configured to encode the first image data in the first encoding mode. The encoding mode determination circuit is additionally configured to select a second encoding mode for encoding second image data received (n−1)th after the first image data are received; and to select a third encoding mode for encoding third image data received(n)th after the first image data are received, based on a second set of conditions respectively corresponding to the first set of encoding modes. A second condition in the second set of the conditions corresponding to the second encoding mode includes a wider range of values than a first condition in the first set of the conditions corresponding to the second encoding mode.

According to some embodiments, which may include the aforementioned embodiments, a display driver circuit includes an encoding mode determination circuit and an encoder. The encoding mode determination circuit is configured to receive first image data, second image data, and third image data sequentially and successively; select a first encoding mode for encoding the first image data among a plurality of encoding modes select a second encoding mode for encoding the second image data among the encoding modes based on a first set of conditions respectively corresponding to the encoding modes, the first set of conditions including a first condition corresponding to the second encoding mode; and select a third encoding mode for encoding the third image data among the encoding modes based on a second set of conditions respectively corresponding to the encoding modes. The second set of conditions includes a second condition corresponding to the third encoding mode. The encoder is configured to encode the first image data in the first encoding mode that selected, and to encode the second image data in the second encoding mode that selected. The second encoding mode is different from the first encoding mode, a second range corresponding to the second condition is wider range than a first range corresponding to the first condition.

A display driver circuit includes an encoding mode determination circuit and an encoder. The encoding mode determination circuit is configured to determine a first encoding mode for encoding first image data based on a first set of conditions corresponding to encoding modes, the first set of conditions including a first condition, and determine a second encoding mode for encoding second image data received immediately following the first image data, based on a second set of conditions corresponding to the encoding modes, the second set of conditions including a second condition. The encoder is configured to encode the first image data in the first encoding mode. The first condition in the first set includes a first range or set of criteria, and the second condition in the second set includes a second range or second set of criteria, wherein the second range is wider than and includes the first range, or the second set of criteria includes the first set of criteria.

BRIEF DESCRIPTION OF THE FIGURES

The above and other objects and features of the inventive concept will become apparent by describing in detail exemplary embodiments thereof with reference to the accompanying drawings.

FIG. 10 is a table indicating an embodiment of a first set of conditions and a second set of conditions of FIG. 8.

FIG. 11 is a table indicating an embodiment of a conversion value obtained from image data.

DETAILED DESCRIPTION

Figure 1:
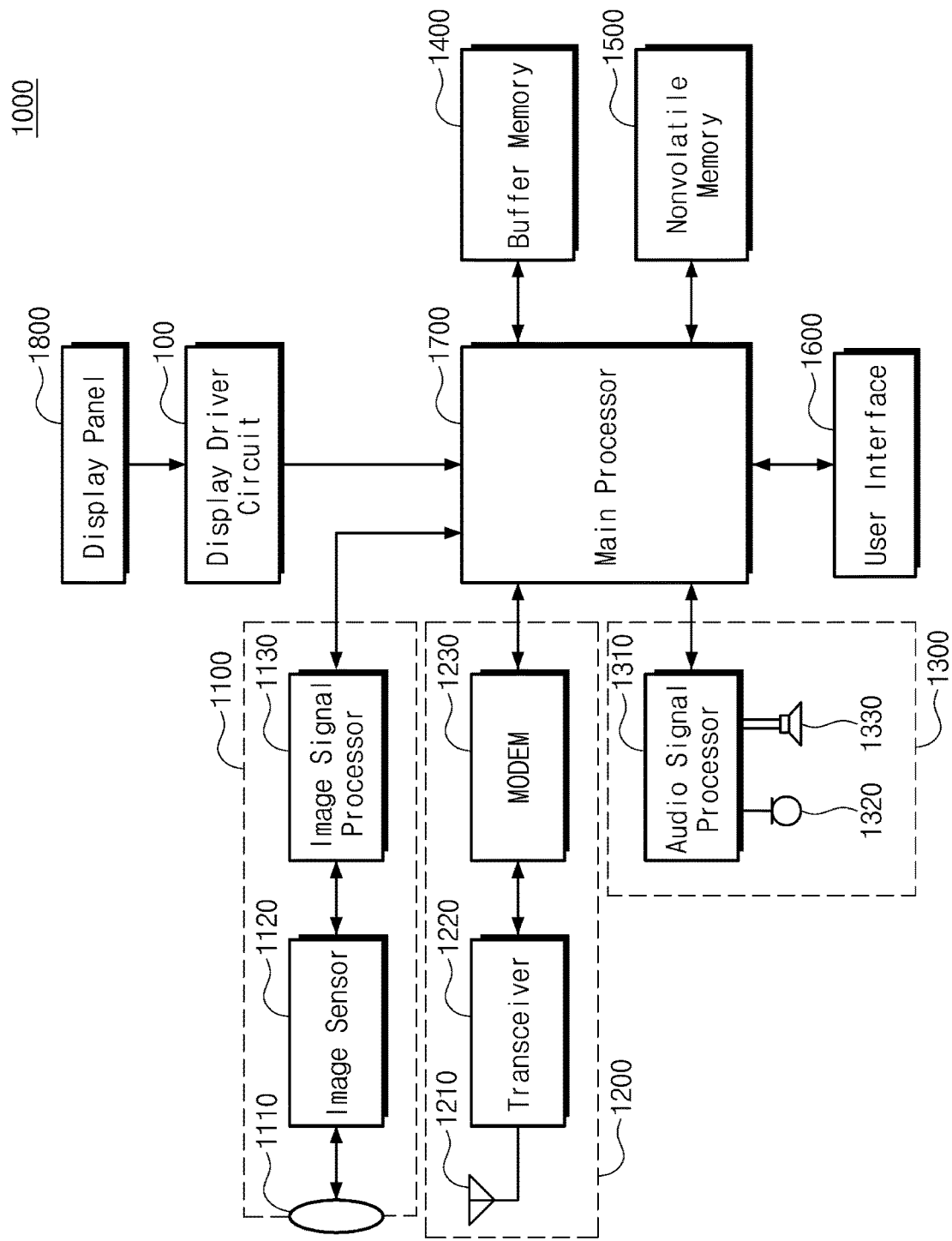
FIG. 1 is a block diagram illustrating an exemplary configuration of an electronic device including a display driver circuit according to embodiments of the inventive concept.

FIG. 1 is a block diagram illustrating an exemplary configuration of an electronic device including a display driver circuit according to embodiments of the inventive concept. For example, an electronic device 1000 may be implemented with one of various types of electronic devices such as a television, a smartphone, a tablet personal computer (PC), a laptop PC, an e-book reader, an MP3 player, a wearable device, etc.

The electronic device 1000 may include various electronic circuits. For example, the electronic circuits of the electronic device 1000 may include a display driver circuit 100, a display panel 1800, an image processing block 1100, a communication block 1200, an audio processing block 1300, a buffer memory 1400, a nonvolatile memory 1500, a user interface 1600, and a main processor 1700.

The display driver circuit 100 may receive image data from the main processor 1700. The display driver circuit 100 may display an image on the display panel 1800 based on the received image data. Exemplary configurations and exemplary operations of the main processor 1700, the display driver circuit 100, and the display panel 1800 will be described with reference to FIG. 2.

As is traditional in the field of the inventive concepts, embodiments are described, and illustrated in the drawings, in terms of functional blocks. Those skilled in the art will appreciate that these blocks are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks being implemented by microprocessors or similar, they may be programmed using software (e.g., microcode) to perform various functions discussed herein and may optionally be driven by firmware and/or software. Alternatively, each block may be implemented by dedicated hardware, or as a combination of dedicated hardware to perform some functions and a processor (e.g., one or more programmed microprocessors and associated circuitry) to perform other functions. Also, each block of the embodiments may be physically separated into two or more interacting and discrete blocks without departing from the scope of the inventive concepts. Further, the blocks of the embodiments may be physically combined into more complex blocks without departing from the scope of the inventive concepts.

The image processing block 1100 may receive light through a lens 1110. An image sensor 1120 and an image signal processor 1130 included in the image processing block 1100 may generate image data associated with an external subject, based on the received light.

The communication block 1200 may exchange signals with an external device/system, external to the electronic device 1000, through an antenna 1210. A transceiver 1220 and a MODEM (Modulator/Demodulator) 1230 of the communication block 1200 may process signals, which are exchanged with the external device/system, in compliance with various wireless communication protocols.

The audio processing block 1300 may process sound information by using an audio signal processor 1310, thus playing and outputting the audio. The audio processing block 1300 may receive an audio input through a microphone 1320. The audio processing block 1300 may output the played audio through a speaker 1330.

The buffer memory 1400 may store data which are used for an operation of the electronic device 1000. For example, the buffer memory 1400 may temporarily store data processed or to be processed by the main processor 1700. For example, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500 may store data regardless of power supply. For example, the nonvolatile memory 1500 may include at least one of various nonvolatile memories such as a flash memory, a PRAM, an MRAM, a ReRAM, and a FRAM. For example, the nonvolatile memory 1500 may include a removable memory such as a secure digital (SD) card, and/or an embedded memory such as an embedded multimedia card (eMMC).

The user interface 1600 may arbitrate communication between a user and the electronic device 1000. For example, the user interface 1600 may include input interfaces such as a keypad, a button, a touch screen, a touch pad, a gyroscope sensor, a vibration sensor, and an acceleration sensor. For example, the user interface 1600 may include output interfaces such as a motor and a light emitting diode (LED) lamp.

The main processor 1700 may control overall operations of the components of the electronic device 1000. The main processor 1700 may process various operations for the purpose of operating the electronic device 1000. For example, the main processor 1700 may be implemented with an operation processing device/circuit, which includes one or more processor cores, such as a general-purpose processor, a special-purpose processor, an application processor, or a microprocessor.

For example, the main processor 1700 may send image data to the display driver circuit 100. The display driver circuit 100 may drive the display panel 1800 based on the image data, for the purpose of displaying an image on the display panel 1800. An image to be displayed on the display panel 1800 may vary with an encoding mode in which image data are encoded at the display driver circuit 100.

For example, the image data may be stored in advance to the nonvolatile memory 1500, and the main processor 1700 may send the image data stored in the nonvolatile memory 1500 to the display driver circuit 100. As another example, the image data may be received in real time through the communication block 1200, the received image data may be stored to the buffer memory 1400, and the main processor 1700 may send the image data stored in the buffer memory 1400 to the display driver circuit 100.

However, the exemplary components illustrated in FIG. 1 are provided for better understanding, and are not intended to limit the inventive concept. The electronic device 1000 may not include one or more of the components illustrated in FIG. 1 or may further include at least one component not illustrated in FIG. 1.

Figure 2:
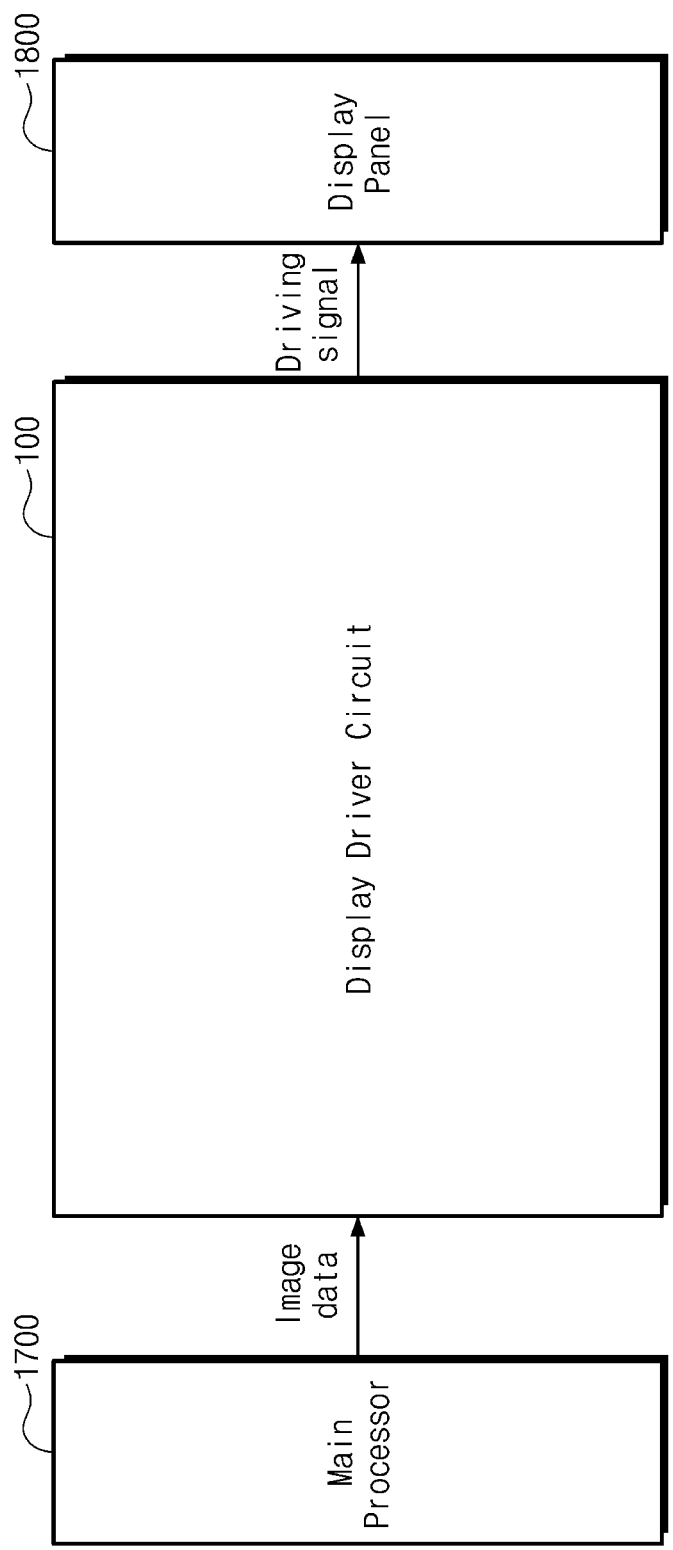
FIG. 2 is a block diagram illustrating an exemplary configuration associated with a display driver circuit of FIG. 1.

FIG. 2 is a block diagram illustrating an exemplary configuration associated with a display driver circuit of FIG. 1.

The main processor 1700 may send image data to the display driver circuit 100. For example, the main processor 1700 may communicate with the display driver circuit 100 in compliance with an interface protocol (e.g., a display serial interface (DSI) protocol of the mobile industry processor interface (MIPI) alliance) supported by the electronic device 1000.

The display driver circuit 100 may display an image on the display panel 1800 based on image data received from the main processor 1700. As the size of the image data becomes larger, power consumption may increase upon processing the image data for the purpose of displaying an image on the display panel 1800. Also, as the size of the image data becomes larger, the size of a memory storing the image data may increase. Accordingly, the display driver circuit 100 may encode and use the received image data.

The display driver circuit 100 may determine an encoding mode for encoding the received image data. The display driver circuit 100 may encode the received image data using the determined encoding mode.

The display panel 1800 may display an image which is based on the image data received from the display driver circuit 100. For example, the display panel 1800 may be implemented with various forms of panels, such as a crystal display (LCD) panel, a light-emitting diode (LED) display panel, an organic LED (OLED) display panel, and an active matrix OLED (AMOLED) display panel.

The display panel 1800 may include a pixel array which includes a plurality of pixels. The pixel array may correspond to a region which is used as a screen where an image is displayed. Each of the pixels of the pixel array may be independently driven by the display driver circuit 100. The display driver circuit 100 may drive the display panel 1800 based on a driving signal.

An image to be displayed on the display panel 1800 may be composed of one or more block images each including one or more pixels. The image data received from the display driver circuit 100 may include information about one or more block images.

A color which is expressed in an image or one or more block images may vary with an encoding mode which is determined by the display driver circuit 100. A color which is expressed in an image or one or more block images may be determined depending on a color space applied to image data. Color spaces may include GRAY (Gray model), RGB (Red Green Blue color model), RGBW (Red Green Blue White color model), and YUV (YUV color image pipeline). The color spaces may correspond to encoding modes, respectively. For example, in the case where the determined encoding mode corresponds to the GRAY color space, a color to be expressed in an image may be a combination of black and white. For another example, in the case where the determined encoding mode corresponds to the RGB color space, a color to be expressed in an image may be a combination of red (R), green (G), and blue (B).

The display driver circuit 100 may receive image data sequentially from the main processor 1700. The display panel 1800 may display an image based on the received image data in order in which the image data are received. For example, the display driver circuit 100 may receive first image data from the main processor 1700 and may then receive second image data from the main processor 1700. The display panel 1800 may display a first image based on the first image data and may then display a second image based on the second image data.

In the following descriptions, the first image data and the second image data are any two data of a plurality of image data received sequentially and successively. The first image data and the second image data are received sequentially and successively. The first image data are image data first received among the two image data. The second image data are image data received immediately following the first image data. Note, however, that unless the context indicates otherwise, terms such as "first," "second," etc., may be used in the specification or claims simply to name certain objects or steps, as a naming convention, and therefore do not necessarily connote an order or location of the items they describe.

An encoding mode of the first image data and an encoding mode of the second image data may be determined differently at the display driver circuit 100. For example, the encoding mode of the first image data may be a first encoding mode, and the encoding mode of the second image data may be a second encoding mode different from the first encoding mode. However, in certain instances, a first encoding mode and a second encoding mode may refer to the same mode applied at different times. Thus, two encoding modes that use different encoding schemes will be described as different encoding modes, and two encoding modes that use the same encoding scheme will be described as the same encoding mode.

In the case where the encoding mode of the first image data and the encoding mode of the second image data are different, a color to be expressed in the first image and a color to be expressed in the second image may be different. In the case where colors expressed in two images displayed sequentially and successively are different from each other, a flicker may occur. The flicker is a phenomenon in which an image displayed on the display panel 1800 blinks or dithers finely. The flicker may make user's eyes tired or concentration of the user low, thus making the user feel dizzy.

A plurality of image data which are sent sequentially and successively from the main processor 1700 may include the same or similar information. For example, according to exemplary embodiments, the plurality of image data which are sent sequentially and successively from the main processor 1700 may include the same or similar pixel values. In this case, encoding modes for the plurality of image data may be determined to be identical to each other. For example, in the case where the plurality of image data include the same information, the display panel 1800 may display a still image.

However, even though the plurality of image data including the same information are sent from the main processor 1700, noise or dither may cause an error in which information included in image data experiences an unintended change. The noise or dither may occur in an image processing process. Also, the noise or dither may occur in the process where image data are received from the display driver circuit 100 from the main processor 1700.

The error arising from the image data may be amplified in the process of encoding the image data. For example, in the case where the information included in the second image data has an unintended change, even though the second image data include the same information as the first image data, encoding modes may be determined differently with regard to the first and second image data. In the case where colors which are respectively expressed in two images to be displayed in a row based on two received image data in a row are different from each other, the flicker may occur.

The display driver circuit 100 according to an embodiment of the inventive concept may determine an encoding mode of each of a plurality of image data based on variable conditions. Accordingly, encoding modes of a plurality of image data received in a row may be prevented from being determined differently due to the noise or dither. As a result, the flicker due to the noise or dither may decrease. Configurations and operations of the display driver circuit 100 will be described with reference to FIGS. 3 to 14.

Figure 3:
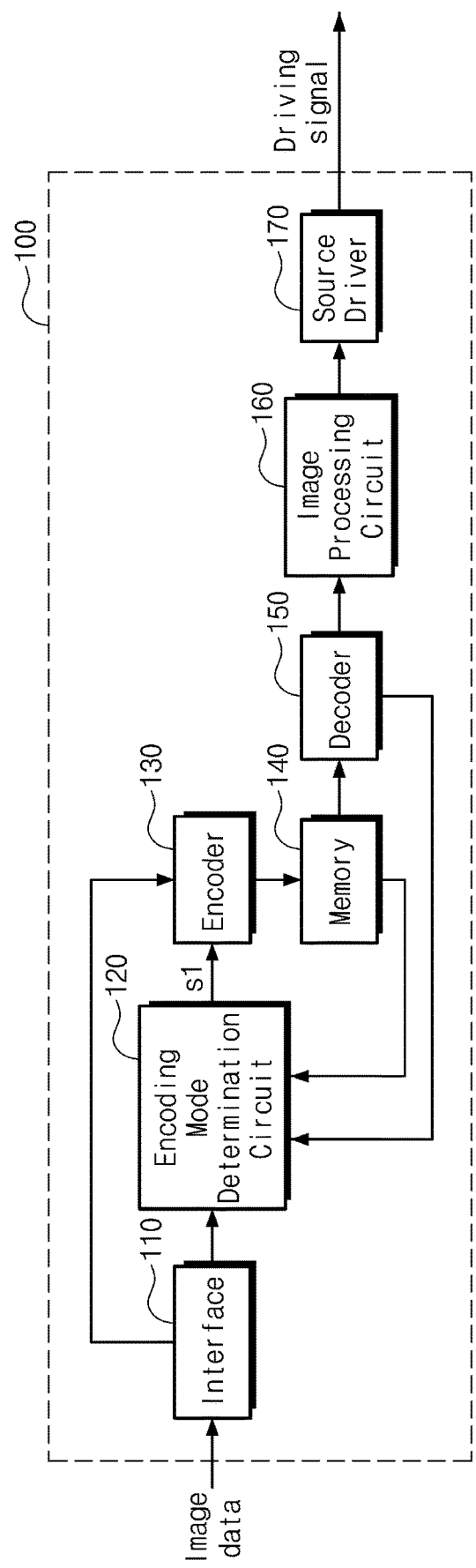
FIG. 3 is a block diagram illustrating an exemplary configuration of a display driver circuit of FIG. 2.

FIG. 3 is a block diagram illustrating an exemplary configuration of a display driver circuit of FIG. 2.

The display driver circuit 100 may include an interface 110, an encoding mode determination circuit 120, an encoder 130, a memory 140, a decoder 150, an image processing circuit 160, and a source driver 170. However, FIG. 3 shows only an exemplary configuration of the display driver circuit 100, and the display driver circuit 100 may further include components not illustrated in FIG. 3. Alternatively, the display driver circuit 100 may not include one or more of the components illustrated in FIG. 3.

The interface 110 may receive image data from the main processor 1700. The received image data may include information about an image to be displayed on the display panel 1800. The interface 110 may send the received image data to other components in the display driver circuit 100.

The encoding mode determination circuit 120 may receive image data from the interface 110. The encoding mode determination circuit 120 may determine an encoding mode for encoding the received image data. As an example, a color which is expressed in an image to be displayed on the display panel 1800 may vary with the determined encoding mode.

The encoding mode determination circuit 120 may generate a signal s1. The signal s1 may include information about the determined encoding mode.

The encoder 130 may receive image data from the interface 110. The encoder 130 may receive the signal s1 from the encoding mode determination circuit 120. The encoder 130 may encode image data in the encoding mode which is determined by the encoding mode determination circuit 120, based on the signal s1.

The memory 140 may receive the image data encoded by the encoder 130.

The memory 140 stores the encoded image data. The memory 140 may include a volatile memory and/or a nonvolatile memory. For example, the memory 140 may include at least one of a volatile memory (a DRAM, an SRAM, or an SDRAM) and a nonvolatile memory (a PROM, an EPROM, a flash ROM, or a flash memory).

The decoder 150 receives image data stored in the memory 140. The decoder 150 may decode the image data received from the memory 140. In the case where the display driver circuit 100 includes an encoder for the purpose of encoding image data, the display driver circuit 100 may include the decoder 150 corresponding to an encoding format of the encoder 130.

The image processing circuit 160 receives the image data decoded by the decoder 150. The image processing circuit 160 may process the decoded image data, thus improving the quality of the image data.

The source driver 170 receives the image data processed by the image processing circuit 160. The source driver 170 outputs a driving signal based on the processed image data. The source driver 170 drives data lines connected to the pixels of the display panel 1800. The source driver 170 may drive the data lines based on the driving signal such that an image is displayed on the display panel 1800. Therefore, the source driver 170 may drive the display panel 1800.

The interface 110 may receive image data sequentially from the main processor 1700. The interface 110 may send the received image data to other components in the display driver circuit 100 in order in which image data are received. For example, in the case where the first image data and the second image data are received sequentially and successively from the main processor 1700, the interface 110 may send the first image data to the encoding mode determination circuit 120 and the encoder 130 and may then subsequently send the second image data to the encoding mode determination circuit 120 and the encoder 130.

The encoding mode determination circuit 120 may receive image data sequentially from the interface 110. The encoding mode determination circuit 120 may determine an encoding mode of image data in order in which image data are received. For example, in the case where the first image data and the second image data are received sequentially and successively from the interface 110, the encoding mode determination circuit 120 may first determine an encoding mode of the first image data and may then determine an encoding mode of the second image data.

The encoder 130 may encode the first image data in the determined encoding mode of the first image data. The memory 140 may store the image data encoded by the encoder 130. The decoder 150 may decode the first image data stored in the memory 140. The encoding mode determination circuit 120 may receive the first image data stored in the memory 140 or the first image data decoded in the decoder 150. The encoding mode determination circuit 120 may identify the encoding mode of the first image data based on the first image data thus received. The encoding mode determination circuit 120 may determine the encoding mode of the second image data based on the identified encoding mode of the first image data.

Figure 4:
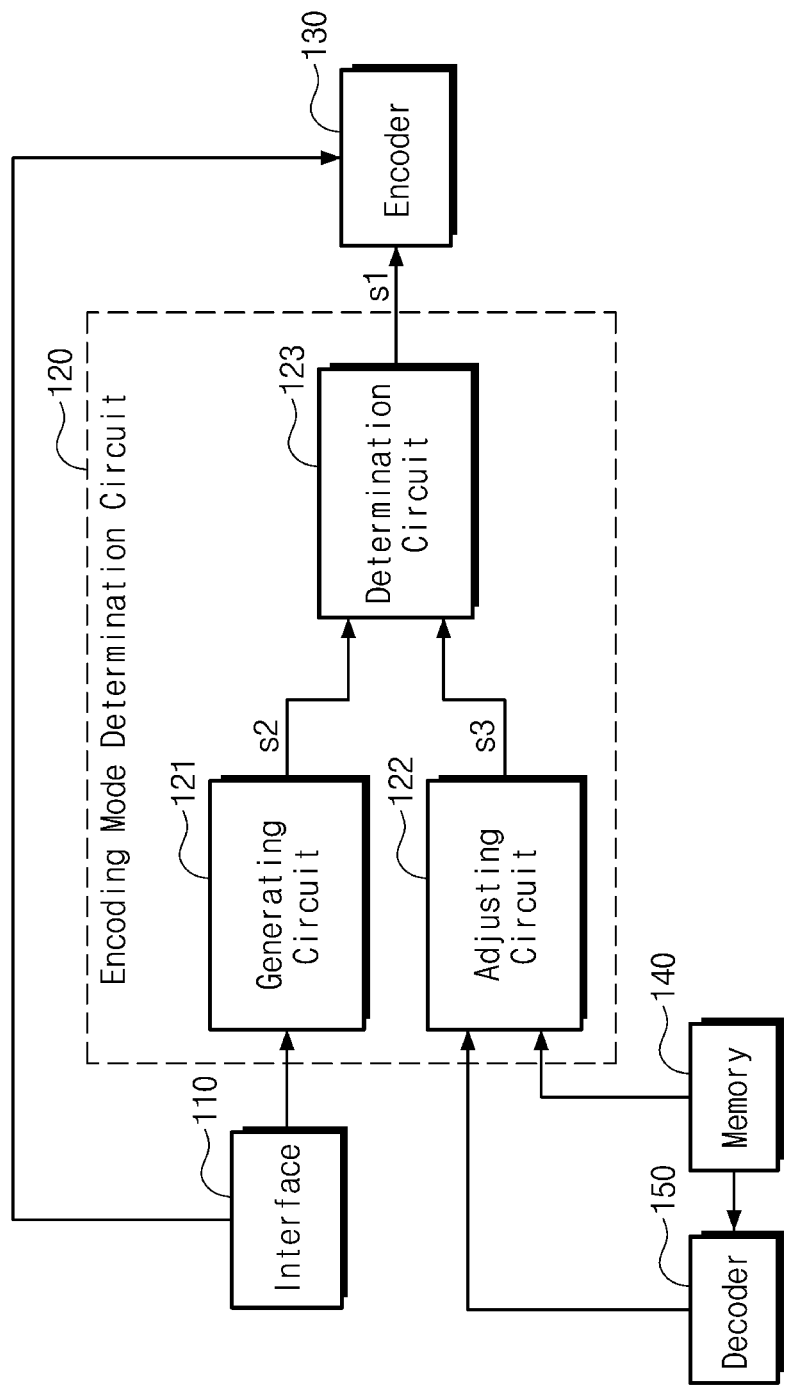
FIG. 4 is a block diagram illustrating an exemplary configuration of an encoding mode determination circuit of FIG. 3.

FIG. 4 is a block diagram illustrating an exemplary configuration of an encoding mode determination circuit of FIG. 3.

An operation in which the encoding mode determination circuit 120 determines an encoding mode of the second image data based on an encoding mode of the first image data will be described with reference to FIG. 4. As described with reference to FIG. 3, the encoding mode determination circuit 120 may receive the first image data stored in the memory 140 or decoded first image data. An operation in which the first image data are decoded by the decoder 150 after being sent from the interface 110 is described with reference to FIG. 3, and thus, additional description will be omitted to avoid redundancy.

The encoding mode determination circuit 120 may include a generating circuit 121, an adjusting circuit 122, and a determination circuit 123.

The generating circuit 121 may receive the second image data from the interface 110. The generating circuit 121 may generate a conversion value which is based on the second image data. The conversion value may be generated based on pixel values included in the second image data, but the disclosure is not limited thereto. The second image data may include pixel values associated with a color which is expressed in an image to be displayed on the display panel 1800. For example, the second image data may include a red (R) pixel value, a green (G) pixel value, and a blue (B) pixel value. However, the inventive concept is not limited thereto, and the second image data may include pixel values of various components. For example, the second image data may include a red (R) pixel value, a green (G) pixel value, a blue (B) pixel value, and a white (W) pixel value. For another example, the second image data may include a pixel value of a Y channel, a pixel value of a U channel, and a pixel value of a V channel.

The conversion value may be generated based on difference values between the pixel values included in the second image data. A pixel value may represent a brightness, or intensity of a pixel, for example. The conversion value may be the maximum value among the difference values between the pixel values included in the second image data. For example, in the case where the R pixel value, the G pixel value, and the B pixel value included in the second image data are "10", "15", and "30", respectively, the conversion value may be "20" (=30−10). However, the inventive concept is not limited thereto, and the conversion value may be generated based on pixel values included in the second image data, in various methods. For example, the conversion value may be generated based on the remaining pixel values of the pixel values of the second image data other than the least significant bit (LSB). For another example, the conversion value may be an average value of the pixel values of the second image data. The generating circuit 121 may generate a signal s2. The signal s2 may include information about the conversion value.

The adjusting circuit 122 may receive the first image data stored in the memory 140 or decoded first image data. The adjusting circuit 122 may identify an encoding mode of the first image data based on the received first image data. For example, a header of the received first image data may include information about the encoding mode of the first image data. The adjusting circuit 122 may identify an encoding mode in which the first image data are encoded, based on information included in the header of the received first image data.

The adjusting circuit 122 may include information about a first set of conditions. The conditions in the first set may correspond to encoding modes, respectively. The conditions in the first set may be updated periodically or randomly. In the case where the second image data are received periodically or after the display driver circuit 100 is reset, the first set of conditions may be used to determine the encoding mode of the second image data. The first set of conditions may be a default set that includes a plurality of conditions, each condition corresponding to an encoding mode.

The adjusting circuit 122 may include information about a second set of conditions. The conditions in the second set may correspond to the encoding modes, respectively. Compared to the first set of conditions, the second set may be an adjusted set of conditions, including a plurality of adjusted conditions, different from corresponding conditions of the first set of conditions, each adjusted condition corresponding to an encoding mode.

The adjusting circuit 122 may generate the conditions in the second set, and thus may use an adjusted set of conditions compared to the first set, based on the encoding mode of the first image data and the first set of conditions. For example, a first condition in the second set corresponding to the encoding mode of the first image data may be different from a first condition in the first set corresponding to the encoding mode of the first image data. The different conditions may overlap in some respects, however. For example, if the first condition in the first set includes a first range of values that correspond to a particular encoding mode, the first condition in the second set may include a wider range of values that includes the first range of values to correspond to the same particular encoding mode. As another example, a first range for a first condition in the second set corresponding to a particular encoding mode of the first image data may have a lower value and a higher upper value than a first range of the first condition in the first set corresponding to the particular encoding mode of the first image data. The first set of conditions and the second set of conditions will be described further with reference to FIGS. 6 to 8. The adjusting circuit 122 may be referred to herein as a condition set selection circuit, or condition set setting circuit, since it may select or determine the condition set to be used (e.g., which may be as a result of adjusting the previous condition set).

The adjusting circuit 122 may generate a signal s3. The signal s3 may include information about the first set of conditions or information about the second set of conditions. For example, periodically or in the case where the display driver circuit 100 is reset, the signal s3 may include information designating a first (e.g., default) set of conditions.

The determination circuit 123, also described as a mode selection circuit, may receive the signals s2 and s3. The signal s2 may include information about the conversion value obtained from the second image data (e.g., it may include the determined conversion value). The signal s3 may include information about the first set of conditions or the second set of conditions (e.g., it may include the first set of conditions or the second set of conditions).

The determination circuit 123 may determine, or select, the encoding mode of the second image data based on the conversion value and information about the conditions included in the signal s3. For example, in the case where the conversion value for the second image data satisfies a first condition corresponding to the first encoding mode (which could be based on either the first set of conditions or the second set of conditions), the encoding mode of the second image data may be determined as a first encoding mode of the encoding modes.

The determination circuit 123 may generate the signal s1 including information about the encoding mode of the second image data (e.g., an indicator indicating which encoding mode to use for the second image data).

The encoder 130 may receive the signal s1. The encoder 130 may receive the second image data from the interface 110. The encoder 130 may encode image data in the encoding mode which is determined by the determination circuit 123, based on the signal s1.

Figure 5:
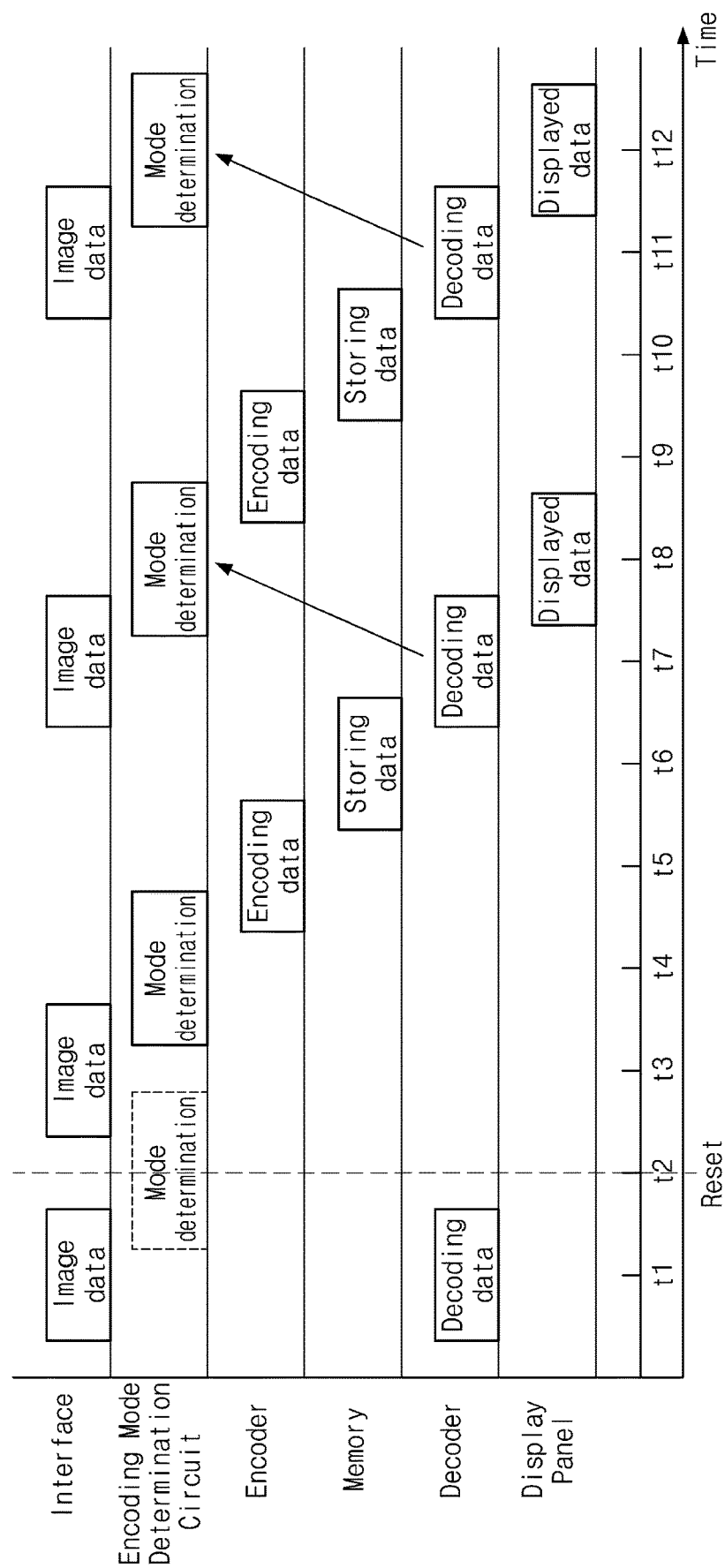
FIG. 5 is a timing diagram for describing an exemplary operation of a display driver circuit of FIG. 3.

FIG. 5 is a timing diagram for describing an operation of a display driver circuit of FIG. 3. For better understanding, FIGS. 3 and 5 will be referenced together.

However, the inventive concept is not limited to an operation of a display driver circuit which will be described with reference to FIG. 5, and the display driver circuit according to an embodiment of the inventive concept may operate during a time interval.

An operation in which the display driver circuit 100 determines the encoding mode of first image data in the case where the display driver circuit 100 is reset after previous image data are received and before the first image data are received will be described with reference to FIG. 5. Also, an operation in which the display driver circuit 100 determines an encoding mode of second image data based on the first image data decoded by the decoder 150 will be described with reference to FIG. 5. However, the inventive concept is not limited thereto, and the display driver circuit 100 may determine the encoding mode of the second image data based on the first image data stored in the memory 140.

At a time point t1, the interface 110 receives the image data (described here as "previous image data") from the main processor 1700.

At a time point t2, the encoding mode determination circuit 120 receives the previous image data from the interface 110. The display driver circuit 100 may be reset before the encoding mode determination circuit 120 determines the encoding mode of the previous image data. In the case where the display driver circuit 100 is reset, the display driver circuit 100 may stop an operation associated with the received previous image data. In this case, the encoding mode determination circuit 120 may not determine the encoding mode of the previous image data.

At a time point t3, the interface 110 receives the second image data from the main processor 1700.

At the time point t4, the encoding mode determination circuit 120 receives first image data from the interface 110. The first image data may be image data first received after the display driver circuit 100 is reset. The encoding mode determination circuit 120 determines the encoding mode of the first image data. The encoding mode determination circuit 120 may use a first set of conditions (e.g., a default set of conditions) for the purpose of determining the encoding mode of the first image data. When a conversion value obtained from the first image data satisfies a first condition in the first set of conditions, the encoding mode determination circuit 120 determines, or selects, the encoding mode of the first image data as a first encoding mode corresponding to the first condition in the first set of conditions. However, the inventive concept is not limited thereto, and the first set of conditions (e.g., a default set of conditions) may be used periodically, and not only after a reset, to determine the encoding mode of image data received from the main processor 1700.

At a time point t5, the encoder 130 encodes the first image data in the determined encoding mode.

At a time point t6, the memory 140 stores the encoded first image data.

At the time point t7, the decoder 150 decodes the first image data stored in the memory 140. Also, at the time point t7, the interface 110 receives second image data from the main processor 1700. In the following descriptions, the second image data are data received immediately following the first image data, and may be described with respect to the first image data, as the next image data, or consecutive image data.

At a time point t8, the display panel 1800 displays an image based on the first image data.

Also, at the time point t8, the encoding mode determination circuit 120 receives the second image data from the interface 110. The encoding mode determination circuit 120 may also receive the decoded first image data at the time point t8. The encoding mode determination circuit 120 may identify the encoding mode of the first image data based on the decoded first image data. In one embodiment, the encoding mode determination circuit 120 may select or generate the second set of conditions based on the encoding mode of the first image data. For example, the second set of conditions may be selected or generated based on the encoding mode of the first image data and the first set of conditions. The conditions in the second set may be conditions obtained by adjusting the first set of conditions.

For example, in the case where the encoding mode of the first image data is determined as the first encoding mode based on the first condition in the first set of conditions corresponding to a first range or set of criteria, the first condition in the second set of conditions corresponding to the first encoding mode may include the entire first range or set of criteria, and additional range values or criteria that expand the first range or set of criteria included in the first condition in the first set corresponding to the first encoding mode. For another example, a range for first condition in the second set may have higher lower and upper end values than a range which the first condition in the first set has.

However, the inventive concept is not limited thereto, and the first image data and the second image data may not be received sequentially and successively. In this case, the second set of conditions may be generated based on the first set of conditions and an encoding mode of image data immediately before the second image data are received.

The encoding mode determination circuit 120 may use the second set of conditions for the purpose of determining the encoding mode of the second image data. As an example, in the case where a conversion value obtained from the second image data satisfies the first condition in the second set, the encoding mode determination circuit 120 determines the encoding mode of the second image data as the first encoding mode corresponding to the first condition in the second set.

Between a time point t9 and a time point t12, the display driver circuit 100 may provide operations corresponding to the operations from the time point t5 to the time point t8. Thus, additional description will be omitted to avoid redundancy.

At a time point t11, the interface 110 may receive third image data from the main processor 1700. In the following descriptions, the third image data are data which are received immediately following the second image data.

At the time point t12, the encoding mode determination circuit 120 receives the third image data from the interface 110. Also, at the time point t12, the encoding mode determination circuit 120 receives the decoded second image data. The encoding mode determination circuit 120 may identify the encoding mode of the second image data based on the decoded second image data.

In some situations, the encoding mode determination circuit 120 may adjust the second set of conditions based on the encoding mode of the second image data.

In the case where the encoding mode of the second image data is identical to the encoding mode of the first image data, the encoding mode determination circuit 120 may maintain the second set of conditions. In this case, the encoding mode determination circuit 120 may determine the encoding mode of the third image data based on the second set of conditions.

In the case where the encoding mode of the second image data is different from the encoding mode of the first image data, the encoding mode determination circuit 120 may adjust the second set of conditions, and thus, the second set of conditions may be changed and a different set of conditions (e.g., a third set, which may be different from the first and second sets, or the same as the first set) may be selected and used. For example, the third set of conditions in this case could revert back to the first, default set. As in the case where the second set of conditions are selected or generated, and thus used, based on the encoding mode of the first image data, the second set of conditions in the above situation may be adjusted based on the encoding mode of the second image data to form a third set of conditions. Also, as in the case where the second set of conditions are selected or generated, and thus used, based on the encoding mode of the first image data, a third set of conditions in the above situation may be selected or generated, and thus used, based on the encoding mode of the second image data. The encoding mode determination circuit 120 may determine the encoding mode of the third image data based on the third set of conditions thus adjusted and/or selected. An operation in which the second set of conditions is adjusted will be described with reference to FIGS. 6 and 7.

The present invention is not limited to this, the second image data may be (n-1)th received data after the first image data is received. Also, the third image data may be (n)th received data after the first image data is received. The n is integer greater than 2. The case where n is 2 has been described with reference to FIG. 5. In this case, the encoding mode of the second image data is not compared with the encoding mode of the first image data, and is compared with the encoding mode of the image data received (n-2) after the first image data is received.

Also, in the case where the third image data are image data first received after the display driver circuit 100 is reset, the encoding mode determination circuit 120 may use the first set of conditions (e.g., a default set of conditions) for the purpose of determining the encoding mode of the third image data.

Also, at the time point t12, the display panel 1800 may display an image based on the second image data. The image based on the second image data may be displayed after an image based on the first image data is displayed on the display panel 1800.

Figure 6:
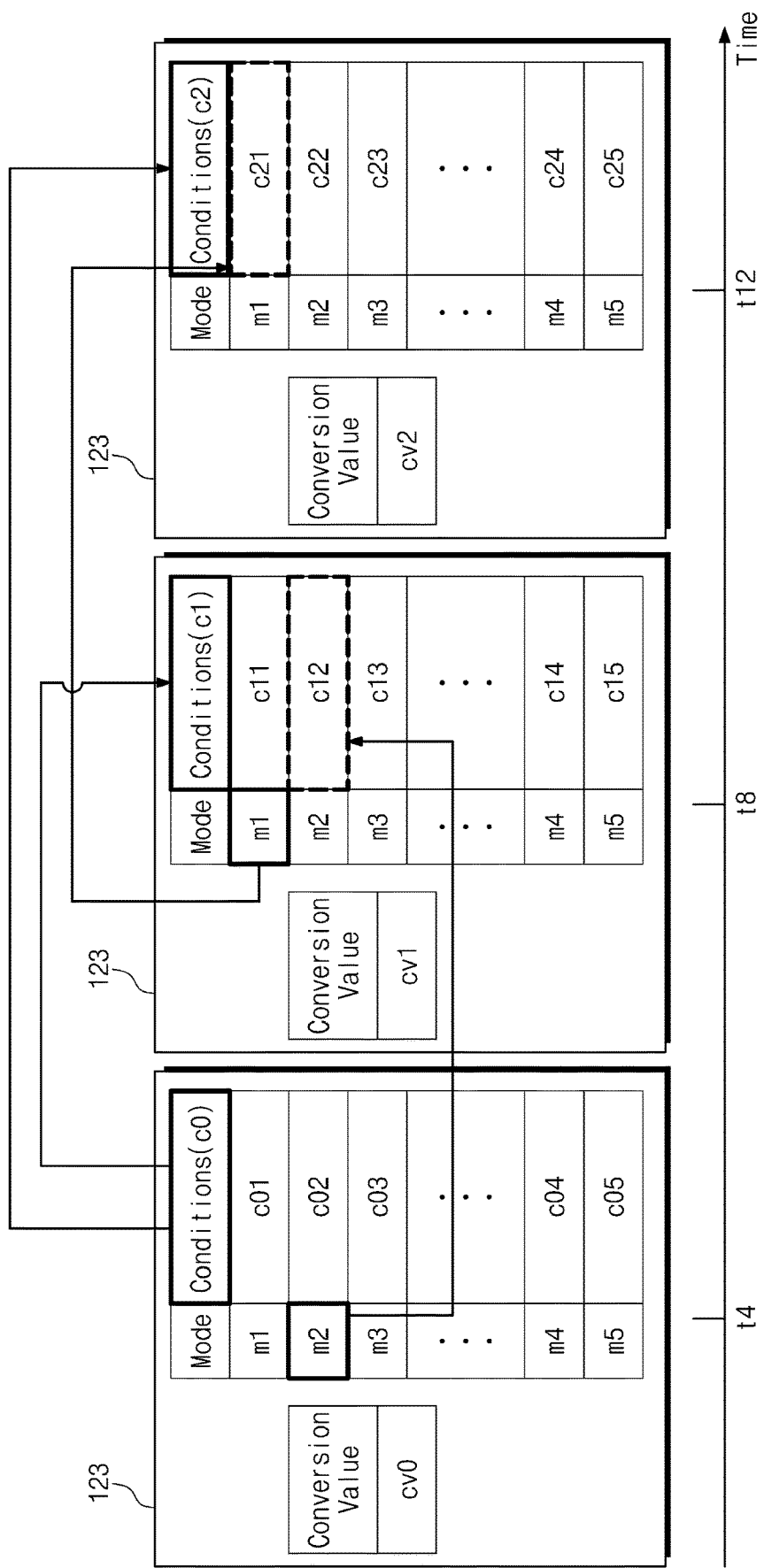
FIG. 6 is a timing diagram for describing an exemplary operation of a determination circuit of FIG. 4.

FIG. 6 is a timing diagram for describing a determination circuit of FIG. 4. For better understanding, FIGS. 4 and 5 will be referenced together with FIG. 6.

An operation in which the encoding mode determination circuit 120 determines encoding modes of the first image data, the second image data, and the third image data in the case where an encoding mode of the first image data and an encoding mode of the second image data are different will be described with reference to FIG. 6.

At the time point t4, the encoding mode determination circuit 120 determines the encoding mode of the first image data. The generating circuit 121 may generate a conversion value cv0 which is based on the first image data. The adjusting circuit 122 may include information about a first set of conditions c01, c02, c03, c04, and c05 (hereinafter collectively referred to as "c0"). For example, the first set of conditions c0 may correspond to encoding modes m1, m2, m3, m4, and m5 (hereinafter collectively referred to as "m0"). The first set of conditions may be a default set of conditions, and may be stored in the adjusting circuit 122.

The determination circuit 123 determines the encoding mode of the first image data based on the information about the conversion value cv0 and the first set of conditions c0. For example, in the case where the conversion value cv0 satisfies the condition c02 in the first set of conditions corresponding to the encoding mode m2, the determination circuit 123 determines the encoding mode of the first image data as the encoding mode m2.

At the time point t8, the encoding mode determination circuit 120 determines the encoding mode of the second image data. The generating circuit 121 may generate a conversion value cv1 which is based on the second image data. The adjusting circuit 122 receives the first image data stored in the memory 140 or decoded first image data. The adjusting circuit 122 identifies the encoding mode m2 of the first image data based on the received first image data.

The adjusting circuit 122 may select or generate a second set of conditions c11, c12, c13, c14, and c15 (hereinafter collectively referred to as "c1") based on the encoding mode m2 of the first image data and the first set of conditions c0. The second set of conditions c1 may correspond to the encoding modes m0, respectively. For example, the second set of conditions may be pre-stored in the adjusting circuit 122, or may be generated based on a pre-stored adjustment scheme, depending on the conversion value cv1. For example, if the conversion value cv1 is within a particular distance from the range that corresponds to the encoding mode m2 of the first image data (e.g., the range associated with the condition c02), then a particular second set of conditions may be selected or generated.

The condition c12 corresponding to the encoding mode m2 of the second image data may be generated to be related to the condition c02 corresponding to the encoding mode m2 of the second image data. For example, a range included in the condition c12 may also be included the condition c02. For another example, part of a range included in the condition c12 may be above a range included in the condition c02.

The remaining conditions c11, c13, c14, and c15 may be generated based on a relationship between the conditions c02 and c12 and the conditions c01, c03, c04, and c05. For example, the remaining conditions c11, c13, c14, and c15 may be obtained by adjusting the conditions c02, c03, c04, and c05 such that the condition c12 and the conditions c01, c03, c04, and c05 do not overlap each other.

As one example, the condition c12 may be determined based on an error value and the condition c02. The error value may be a value corresponding to noise or dither which occurs in the image processing process. The error value may be updated periodically or randomly. The error value may be updated based on a change of the noise or dither. The remaining conditions c11, c13, c14, and c15 may be generated based on the error value and the conditions c01, c03, c04, and c05. A relationship between the first set of conditions c0, the second set of conditions c1, and the error value will be described with reference to FIGS. 8 and 9.

The determination circuit 123 may determine the encoding mode of the second image data based on the information about the conversion value cv1 and the second set of conditions c1. For example, in the case where the conversion value cv1 satisfies the condition c11 corresponding to the encoding mode m1, the determination circuit 123 determines the encoding mode of the second image data as the encoding mode m1.

At the time point t12, the encoding mode determination circuit 120 determines the encoding mode of the third image data. The generating circuit 121 may generate a conversion value cv2 which is based on the third image data. The adjusting circuit 122 may adjust the conditions c1 in the second set based on the encoding mode m1 of the second image data.

The adjusting circuit 122 may identify the encoding mode m1 of the second image data. The adjusting circuit 122 may adjust the conditions c1 in the second set based on the encoding mode m1 of the second image data and the first set of conditions c0. The adjusting circuit 122 may adjust the conditions c1 in the second set in a method which is similar to a method of generating the second set of conditions c1 at the time point t8.

The second set of conditions c1 may be changed to a third set of conditions c21, c22, c23, c24, and c25 (hereinafter collectively referred to as "c2"). The conditions c2 in the third set adjusted may correspond to the encoding modes m0, respectively.

The condition c21 corresponding to the encoding mode m 1 of the third image data may be generated based on the condition c01 corresponding to the encoding mode m1 of the first image data. For example, a range for the condition c21 may include a range for the condition c01. For another example, a range for the condition c21 may be at least in part above a range of the condition c01. The remaining conditions c22, c23, c24, and c25 may be generated based on a relationship between the conditions c01 and c21 and the conditions c02, c03, c04, and c05.

Figure 7:
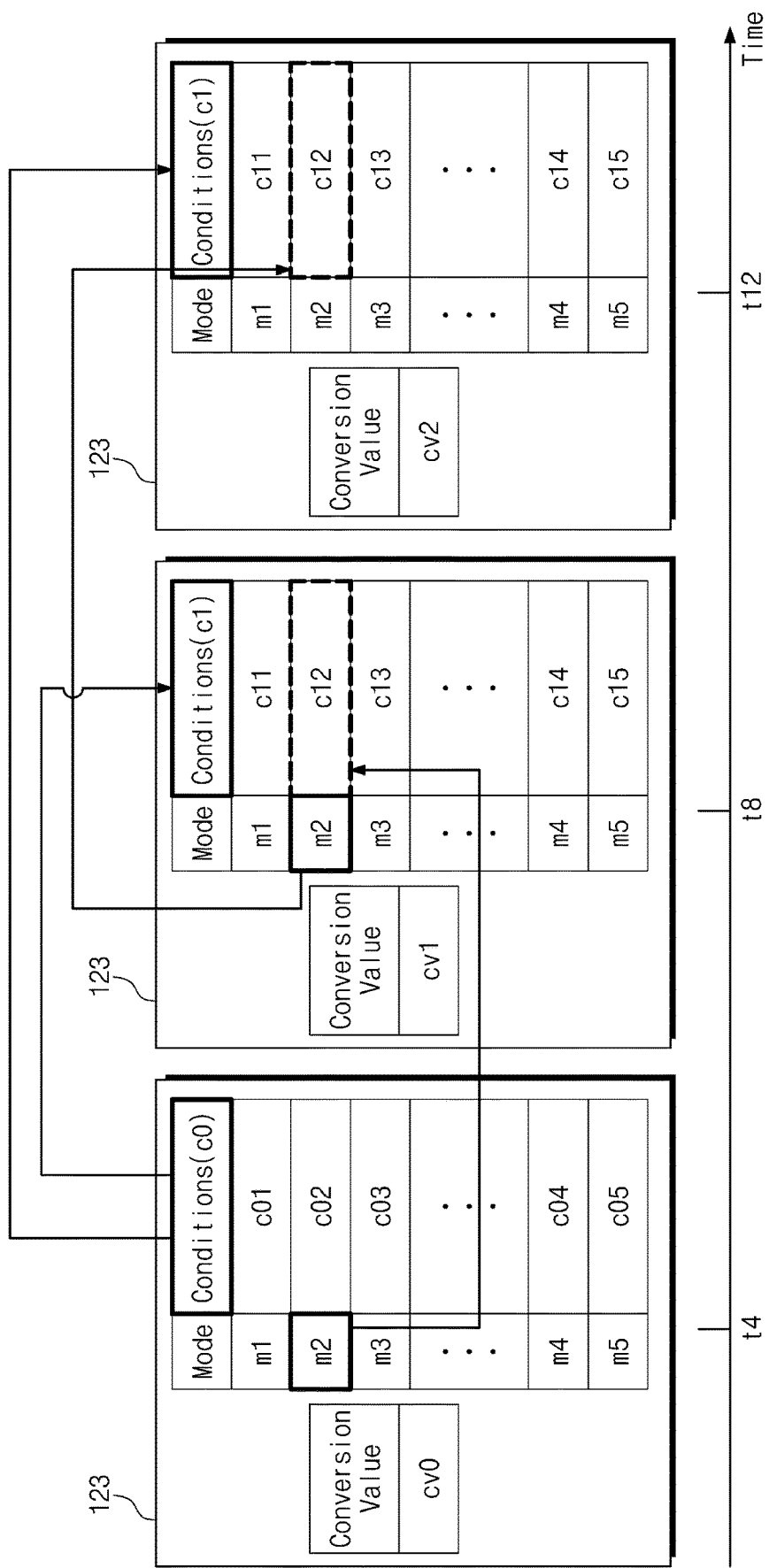
FIG. 7 is a timing diagram for describing an exemplary operation of a determination circuit of FIG. 4.

FIG. 7 is a timing diagram for describing an exemplary operation of a determination circuit of FIG. 4. For better understanding, FIGS. 4 and 5 will be referenced together with FIG. 7.

An operation in which the encoding mode determination circuit 120 determines an encoding mode of the third image data in the case where an encoding mode of the second image data is identical to an encoding mode of the first image data will be described with reference to FIG. 7.

The encoding mode determination circuit 120 may provide operations which correspond to or are identical to the operations described with reference to FIG. 4. Thus, additional description will be omitted to avoid redundancy.

The determination circuit 123 may determine the encoding mode of the second image data as the encoding mode m2 identical to the encoding mode of the first image data.

In the case where the encoding mode of the second image data is identical to the encoding mode of the first image data, the encoding mode determination circuit 120 may maintain the second set of conditions c1. Accordingly, the encoding mode determination circuit 120 may determine the encoding mode of the third image data based on the second set of conditions c1 instead of the second set of adjusted conditions c2 (e.g., a third set of conditions) illustrated in FIG. 6.

Figure 8:
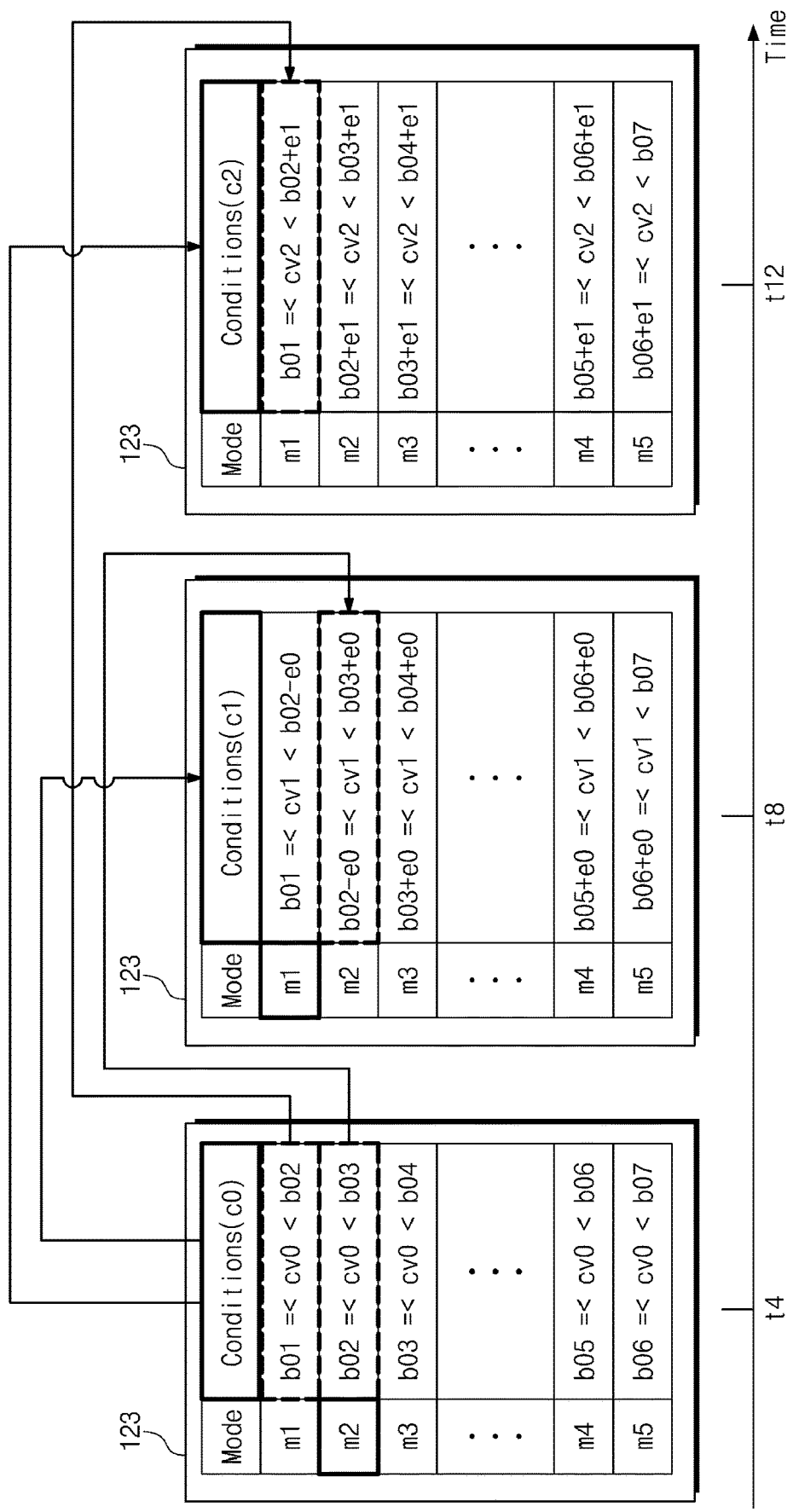
FIG. 8 is a timing diagram for describing an exemplary operation of a determination circuit of FIG. 4.

FIG. 8 is a timing diagram for describing an exemplary operation of a determination circuit of FIG. 4. For better understanding, FIG. 6 will be referenced together with FIG. 8.

Exemplary relationships between the first set of conditions c0, the second set of conditions c1, and the second set of adjusted conditions c2 illustrated in FIG. 6 will be described with reference to FIG. 8. Operations of the encoding mode determination circuit 120 to be described with reference to FIG. 8 may correspond to the operations of the encoding mode determination circuit 120 described with reference to FIG. 6. Thus, additional description will be omitted to avoid redundancy.

At the time point t4, the determination circuit 123 may determine the encoding mode of the first image data based on information about the conversion value cv0 and the first set of conditions c0. The first set of conditions c0 may correspond to the case where the conversion value cv0 is between respective lower boundary values b01, b02, b03, b05, and b06 of the first set of conditions c0 and respective upper boundary values b02, b03, b04, b06, and b07 of the first set of conditions c0. For example, the condition c02 in the first set may correspond to the case where the conversion value cv0 is between the lower boundary value b02 and the corresponding upper boundary value b03. In the case where the conversion value cv0 is between the lower boundary value b02 and the corresponding upper boundary value b03, the determination circuit 123 may determine the encoding mode of the first image data as the encoding mode m2. The boundary values described in this example may correspond, for example, to conversion values having numerical values, for example, between 0 and 70 (or between another minimum and maximum value). Other boundary values, and other types of conditions, can be used for the first set of conditions.

The adjusting circuit 122 may include information about the first set of conditions c0. For example, the information included in the adjusting circuit 122 may be the boundary values b01, b02, b03, b04, b05, b06, and b07 of the first set of conditions c0.

At the time point t8, the adjusting circuit 122 may determine the second set of conditions c1 based on an error value e0, the encoding mode m2 of the first image data, and the first set of conditions c0. The error value e0 may correspond to the encoding mode m2 of the first image data. Error values may correspond to the encoding modes m0, respectively. The error values may be identical to or different from each other.

The condition c12 in the second set corresponding to the encoding mode m2 of the second image data may be generated based on the error value e0 and the condition c02 in the first set corresponding to the encoding mode m2 of the first image data. For example, a lower boundary value of the condition c12 in the second set may be a value which is obtained by subtracting the error value e0 from the lower boundary value b02 of the condition c02 in the first set. An upper boundary value of the condition c12 in the second set may be a value which is obtained by adding the error value e0 and the upper boundary value b03 of the condition c02 in the first set. Accordingly, the range of values in condition c12 in the second condition may include all of the values in the range of values of the condition c02 in the first set. The error values described above may relate to an expected error due to dither or noise, and may be selected based on a design requirement or preference. The error values may be updated based on a change of noise occurring in the display driver circuit, or a change of dither, so that new ranges are created.

A range of the condition c02 in the first set may be from the lower boundary value b02 to the corresponding upper boundary value b03. A range of the condition c12 in the second set may be from the lower boundary value (b02−e0) to the upper boundary value (b03+e0). Accordingly, the range of the condition c12 in the second condition may be wider than the range of the condition c02 in the first set.

The remaining conditions c11, c13, c14, and c15 in the second set may be generated and determined based on a relationship between the conditions c02 and c12 and the conditions c01, c03, c04, and c05 in the first set. For example, a difference between lower boundary values of the conditions c02 and c12 may be the error value e0.

For example, lower boundary values of the conditions c13, c14, and c15 in the second set may be values which are obtained by adding the error value e0 and the respective lower boundary values b03, b05, and b06 of the conditions c03, c04, and c05 in the first set. Upper boundary values of the conditions c13 and c14 in the second set may be values which are obtained by adding the error value e0 and the upper boundary values b04 and b06 of the conditions c03 and c04 in the first set. An upper boundary value of the condition c11 in the second set may be a value which is obtained by subtracting the error value e0 from the upper boundary value b02 of the condition c01 in the first set. The different ranges may be selected based on design requirements or preferences, and as a result, the different sets of conditions may be automatically generated or selected based on a predetermined formula that depends on the previously selected condition and range as a variable.

The whole range b07 to b01 of the first set of conditions c0 may be identical to the whole range b07 to b01 of the second set of conditions c1. For example, the smallest boundary value b01 of boundary values of the first set of conditions c0 may be identical to the smallest boundary value b01 of boundary values of the second set of conditions c1. The greatest boundary value b07 of the boundary values of the first set of conditions c0 may be identical to the greatest boundary value b07 of the boundary values of the second set of conditions c1.

The inventive concept is not limited to the above examples, and the second set of conditions c1 may be generated in various methods based on the error value e0 and the first set of conditions c0. For example, a difference between lower boundary values of the conditions c01 and c11 may be proportional to the error value e0.

The adjusting circuit 122 may include information about the second set of conditions c1. For example, the information included in the adjusting circuit 122 may be boundary values of the second set of conditions c1. Thus, a second set of conditions including a second set of ranges may be stored in the adjusting circuit 122.

At the time point t8, the determination circuit 123 determines the encoding mode of the second image data based on the information about the conversion value cv1 and the second set of conditions c1. For example, in the case where the conversion value cv1 is between the lower boundary value b01 of the condition c11 in the second set and the upper boundary value (b02−e0) of the condition c11 in the second set, the determination circuit 123 determines the encoding mode of the second image data as the encoding mode m1.

At the time point t12, the adjusting circuit 122 selects and uses a third set of conditions c2, which may be based on an error value e1, the encoding mode m1 of the second image data, and the first set of conditions c0. The error value e1 of the error values may correspond to the encoding mode m1 of the second image data. The error value e0 may be identical to or different from the error value e1.

Boundary values of the third set of conditions c2 adjusted and determined based on the error value e1, the encoding mode m1 of the second image data, and the first set of conditions c0 may correspond to boundary values of the second set of conditions c1 generated based on the error value e0, the encoding mode m2 of the first image data, and the first set of conditions c0. Thus, additional description will be omitted to avoid redundancy.

Figure 9:
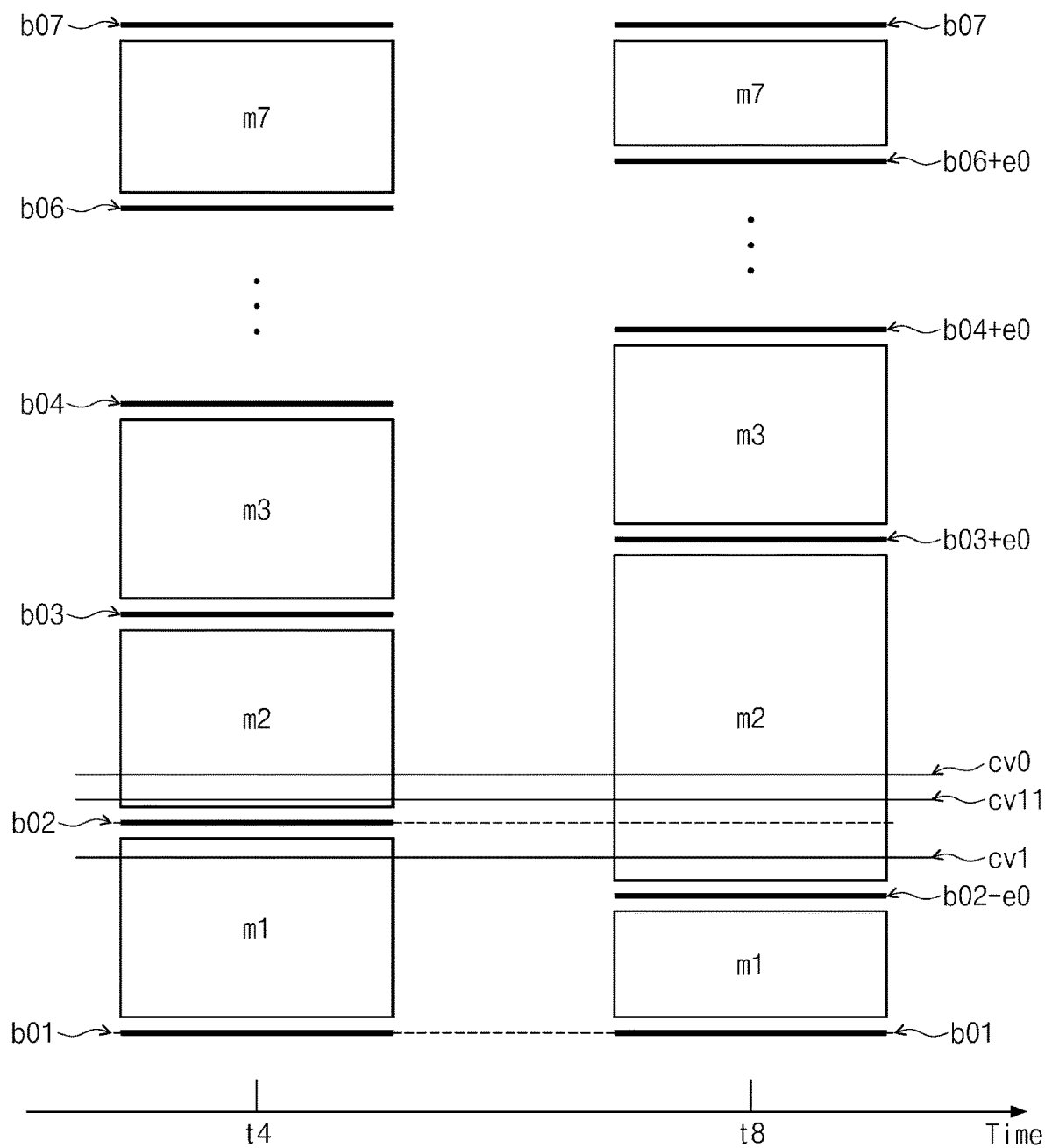
FIG. 9 is a conceptual diagram for describing a difference between a first set of conditions and a second set of conditions of FIG. 8.

FIG. 9 is a conceptual diagram for describing a difference between a first set of conditions and a second set of conditions of FIG. 8. For better understanding, FIG. 8 will be referenced together with FIG. 9.

Referring to FIG. 9, the conversion value cv0 obtained from the first image data may satisfy the conditions c02 in the first set corresponding to the encoding mode m2. Accordingly, the encoding mode of the first image data may be determined as the encoding mode m2.

As described with reference to FIG. 5, the interface 110 may receive the first image data and the second image data sequentially and successively from the main processor 1700. A plurality of image data which are sent sequentially and successively from the main processor 1700 may include the same or similar information. The first image data and the second image data sent sequentially and successively from the main processor 1700 may include the same or similar pixel values. Accordingly, in the case where noise or dither does not occur in the image processing process, a conversion value cv11 which is obtained from the second image data received immediately after the first image data are received may satisfy the condition c02 in the first set.

However, in the case where noise or dither occurs in the image processing process, pixel values included in the second image data may be changed. In this case, the conversion value cv1 may be generated instead of the conversion value cv11.

Referring to FIG. 9, the conversion value cv1 obtained from the second image data may not satisfy the conditions c02 in the first set corresponding to the encoding mode m2. Accordingly, in the case where the encoding mode determination circuit 120 fixedly determines the encoding mode of the second image data based on the first set of conditions c0, the encoding mode of the second image data may be determined as the encoding mode m1. Accordingly, in the case where the encoding mode is determined based on fixed conditions, the encoding mode may be determined differently with regard to image data including the same or similar information. In this case, the flicker may occur.

The encoding mode determination circuit 120 according to an embodiment of the inventive concept may determine an encoding mode of each of a plurality of image data based on variable conditions. For example, the encoding mode determination circuit 120 may determine the encoding mode of the first image data and the encoding mode of the second image data based on the first set of conditions c0 and the second set of conditions c1, respectively. The encoding mode of the second image data may be determined as the encoding mode m2, based on the second set of conditions c1.

Referring to FIG. 9, a range of the condition c12 in the second set corresponding to the encoding mode m2 of the second image data may be different from (e.g., wider than) a range of the condition c02 in the first set corresponding to the encoding mode m2 of the first image data. For example, an upper boundary value (b03+e0) of the condition c12 in the second set may be higher than the upper boundary value b03 of the condition c02 in the first set as much as the error value e0. In one embodiment, the error value e0 may correspond to the greatest difference value between the conversion value cv11 and the conversion value cv1, which may occur due to noise or dither. This difference could be determined, for example, in advance based on testing, and the amount that the upper boundary value (b03+e0) of the condition c12 in the second set varies from the upper boundary value (b03) of the condition c02 in the first set may be chosen based on design requirements or preferences. Accordingly, the inventive concept may prevent each of encoding modes of a plurality of image data including the same or similar information among a plurality of image data received sequentially and successively, from being determined differently due to the noise or dither. As a result, the flicker may decrease.

FIG. 10 is a table indicating an example embodiment of a first set of conditions and a second set of conditions of FIG. 8. For better understanding, FIG. 8 will be referenced together with FIG. 10.

Boundary values of the first set of conditions illustrated in FIG. 10 may be expressed by an integer. Boundary values of the second set of conditions illustrated in FIG. 10 may be expressed by an integer. For example, a lower boundary value b02 and an upper boundary value b03 of the condition c02 in the first set corresponding to the encoding mode m1 may be "10" and "20", respectively.

The error value e0 may be "5". Accordingly, a lower boundary value (b02−e0) and an upper boundary value (b03+e0) of the condition c12 in the second set corresponding to the encoding mode m2 of the second image may be "5" and "25", respectively. Accordingly, a range of the condition c12 in the second condition may be wider than a range of the condition c02 in the first set. The range included in condition c12 in the second set may include the range included in condition c02 in the first set.

FIG. 11 is a table indicating an embodiment of a conversion value obtained from image data. For better understanding, FIG. 10 will be referenced together with FIG. 11.

The generating circuit 121 may receive image data. The generating circuit 121 may generate a conversion value based on the received image data. The conversion value may be generated based on difference values between pixel values included in the image data. The image data may include a red (R) pixel value, a green (G) pixel value, and a blue (B) pixel value. The conversion value may be the maximum value among the difference values between the pixel values included in the image data.

For example, the R pixel value, the G pixel value, and the B pixel value included in the image data may be "90", "100", and "102", respectively. The conversion value cv0 obtained from the first image data may be "12". Since the conversion value cv0 is between "10" and "20", by the first set of conditions c0 illustrated in FIG. 10, the encoding mode of the first image data may be determined as the encoding mode m2.

In the case where noise or dither does not occur, information included in the second image data may be substantially identical to information included in the first image data. The R pixel value, the G pixel value, and the B pixel value included in the third image data may be "90", "100", and "101", respectively. The conversion value cv11 obtained from the second image data may be "11". Since the conversion value cv11 is between "10" and "20", by the first set of conditions c0 illustrated in FIG. 10, the encoding mode of the second image data may be determined as the encoding mode m2.

However, due to noise or dither, pixel values included in the second image data may be changed. The R pixel value, the G pixel value, and the B pixel value included in the second image data may be changed to "90", "100", and "98", respectively. The conversion value cv1 obtained from the second image data may be "8". Since the conversion value cv1 is not between "10" and "20", in the case where the encoding mode determination circuit 120 fixedly determines the encoding mode of the second image data based on the first set of conditions c0, the encoding mode of the second image data may be determined as the encoding mode m1 since the conversion value cv1 ("8") is between "0" and "10", by the first set of conditions c0 illustrated in FIG. 10.

The encoding mode determination circuit 120 according to an embodiment of the inventive concept may determine the encoding mode of the second image data variably based on the second set of conditions c1. Since the conversion value cv1 ("8") is between "5" and "25", by the second set of conditions c1 illustrated in FIG. 10, the encoding mode of the second image data may be determined as the encoding mode m2.

Figure 12:
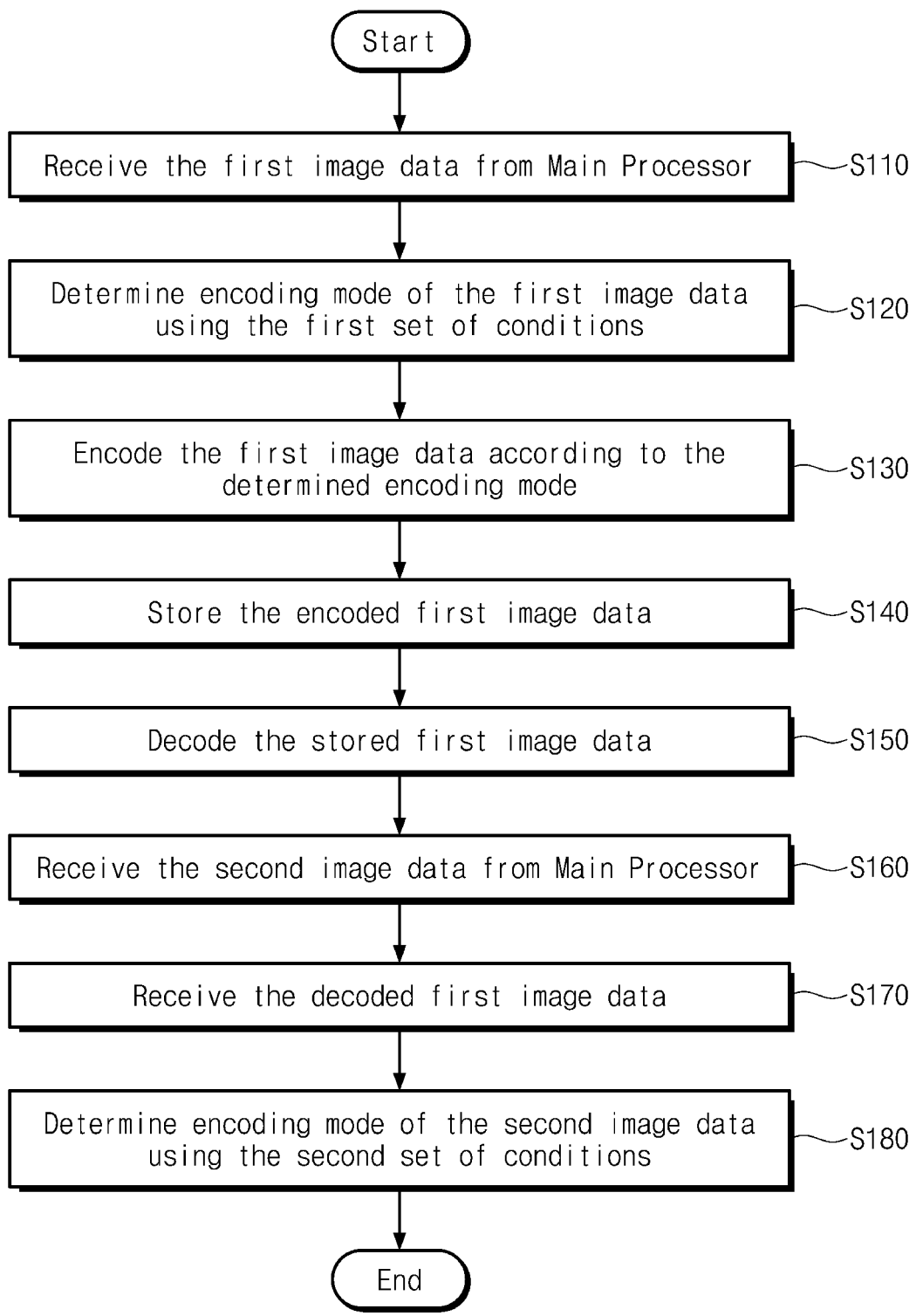
FIG. 12 is a flowchart for describing an exemplary operation of a display driver circuit from a time when first image data of FIG. 5 are received to a time when an encoding mode of second data is determined.

FIG. 12 is a flowchart for describing an operation of a display driver circuit from a time when first image data of FIG. 5 are received to a time when an encoding mode of second data is determined. For better understanding, FIG. 5 will be referenced together with FIG. 12.

In operation S110, the interface 110 receives the first image data from the main processor 1700.

In operation S120, the encoding mode determination circuit 120 receives the first image data from the interface 110. The encoding mode determination circuit 120 determines the encoding mode of the first image data based on the first set of conditions.

In operation S130, the encoder 130 encodes the first image data in the determined encoding mode.

In operation S140, the memory 140 stores the encoded first image data.

In operation S150, the decoder 150 decodes the first image data stored in the memory 140.

In operation S160, the interface 110 receives the second image data from the main processor 1700.

In operation S170, the encoding mode determination circuit 120 receives the decoded first image data. The encoding mode determination circuit 120 may identify the encoding mode of the first image data based on the decoded first image data. The encoding mode determination circuit 120 may then select or generate the second set of conditions based on the encoding mode of the first image data and the first set of conditions.

In operation S180, the encoding mode determination circuit 120 receives the second image data from the interface 110. The encoding mode determination circuit 120 determines the encoding mode of the second image data based on the second set of conditions.

Figure 13:
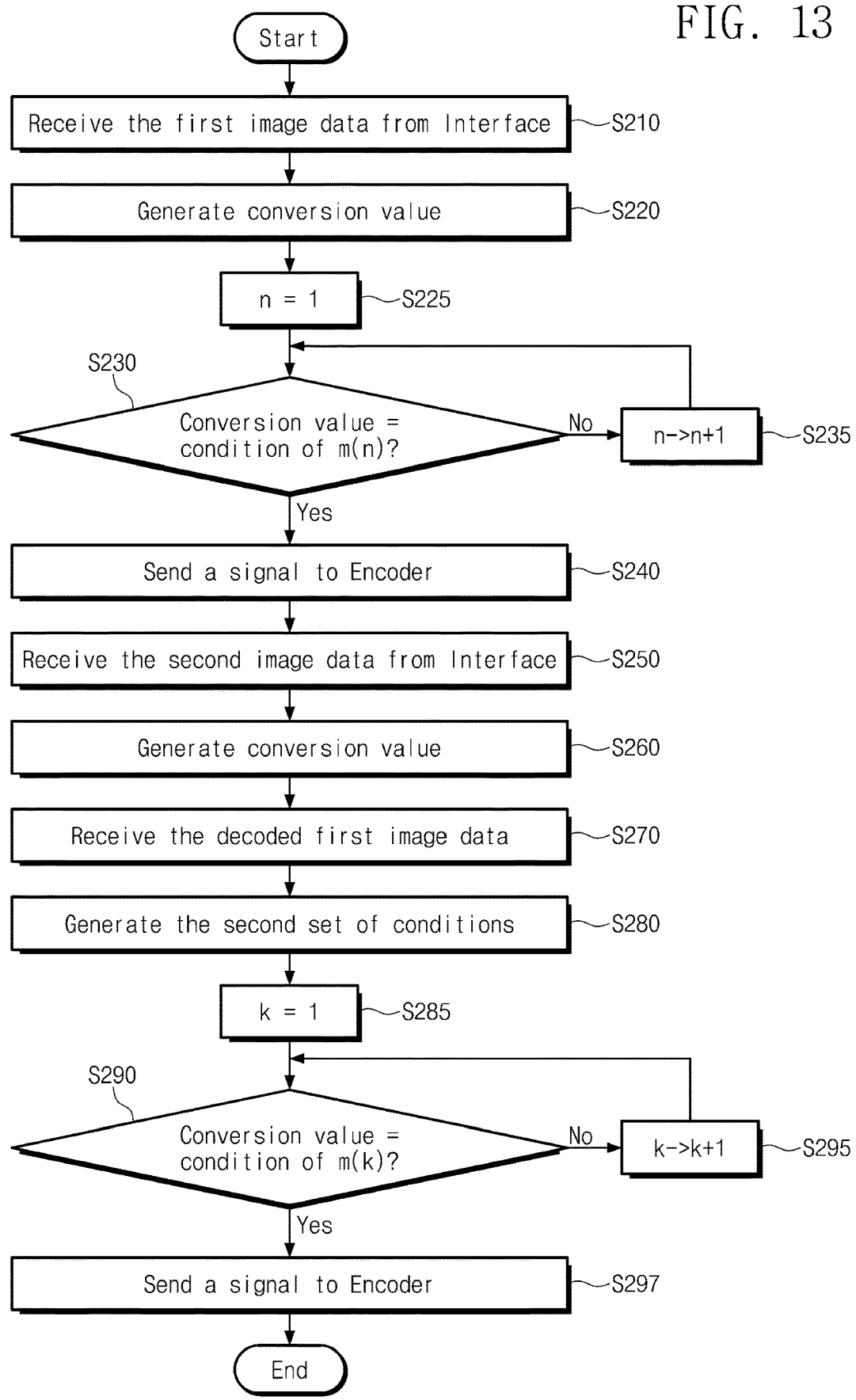
FIG. 13 is a flowchart for describing an operation of an encoding mode determination circuit until an encoding mode of second image data is determined after first image data of FIG. 5 are received.

FIG. 13 is a flowchart for describing an operation of an encoding mode determination circuit until an encoding mode of second image data is determined after first image data of FIG. 5 are received. For better understanding, FIGS. 5 and 6 will be referenced together with FIG. 13.

In operation S210, the generating circuit 121 receives the first image data from the interface 110.

In operation S220, the generating circuit 121 generates the conversion value cv0 from the first image data.

In operation S225, operation S230, and operation S235, the determination circuit 123 determines the encoding mode of the first image data based on the conversion value cv0 and the first set of conditions c0. The determination circuit 123 may determine a condition that the conversion value cv0 satisfies, from among the first set of conditions c0. The determination circuit 123 may first check whether the conversion value cv0 satisfies the condition c01 in the first set corresponding to the encoding mode m1. In the case where the conversion value cv0 does not satisfy the condition c01 in the first set, the determination circuit 123 may check whether the conversion value cv0 satisfies the condition c02 in the first set corresponding to the next encoding mode m2, and this process may repeat until a condition which the conversion value cv0 satisfies is found. However, the inventive concept is not limited thereto, and the order in which the conditions c0 in the first set are checked may be set arbitrarily.

In operation S240, the determination circuit 123 generates the signal s1 including information about the determined encoding mode of the first image data. The determination circuit 123 sends the signal s1 to the encoder 130.

In operation S250, the generating circuit 121 receives the second image data from the interface 110.

In operation S260, the generating circuit 121 generates a conversion value from the second image data.

In operation S270, the adjusting circuit 122 receives the decoded first image data. The adjusting circuit 122 may identify an encoding mode of the first image data based on the decoded first image data.

In operation S280, the adjusting circuit 122 generates (e.g., selects) the second set of conditions c1 based on the encoding mode of the second image data and the first set of conditions c0. In this manner, an adjusted set of conditions may be used as the second set of conditions c1.

In operation S285, operation S290, and operation S295, the determination circuit 123 may determine an encoding mode of the second image data based on the conversion value cv1 and the second set of conditions c1. The determination circuit 123 may determine a condition, which the conversion value cv1 satisfies, from among the second set of conditions c1. The determination circuit 123 may first check whether the conversion value cv1 satisfies the condition c11 in the second set corresponding to the encoding mode m1. In the case where the conversion value cv1 does not satisfy the condition c11 in the second set, the determination circuit 123 may check whether the conversion value cv1 satisfies the condition c12 in the second set corresponding to the next encoding mode m2, etc. However, the inventive concept is not limited thereto, and the order in which the conditions c1 in the second set are checked may be set arbitrarily.

In operation S297, the determination circuit 123 generates the signal s1 including information about the determined encoding mode of the second image data. The determination circuit 123 may send the signal s1 to the encoder 130.

Figure 14:
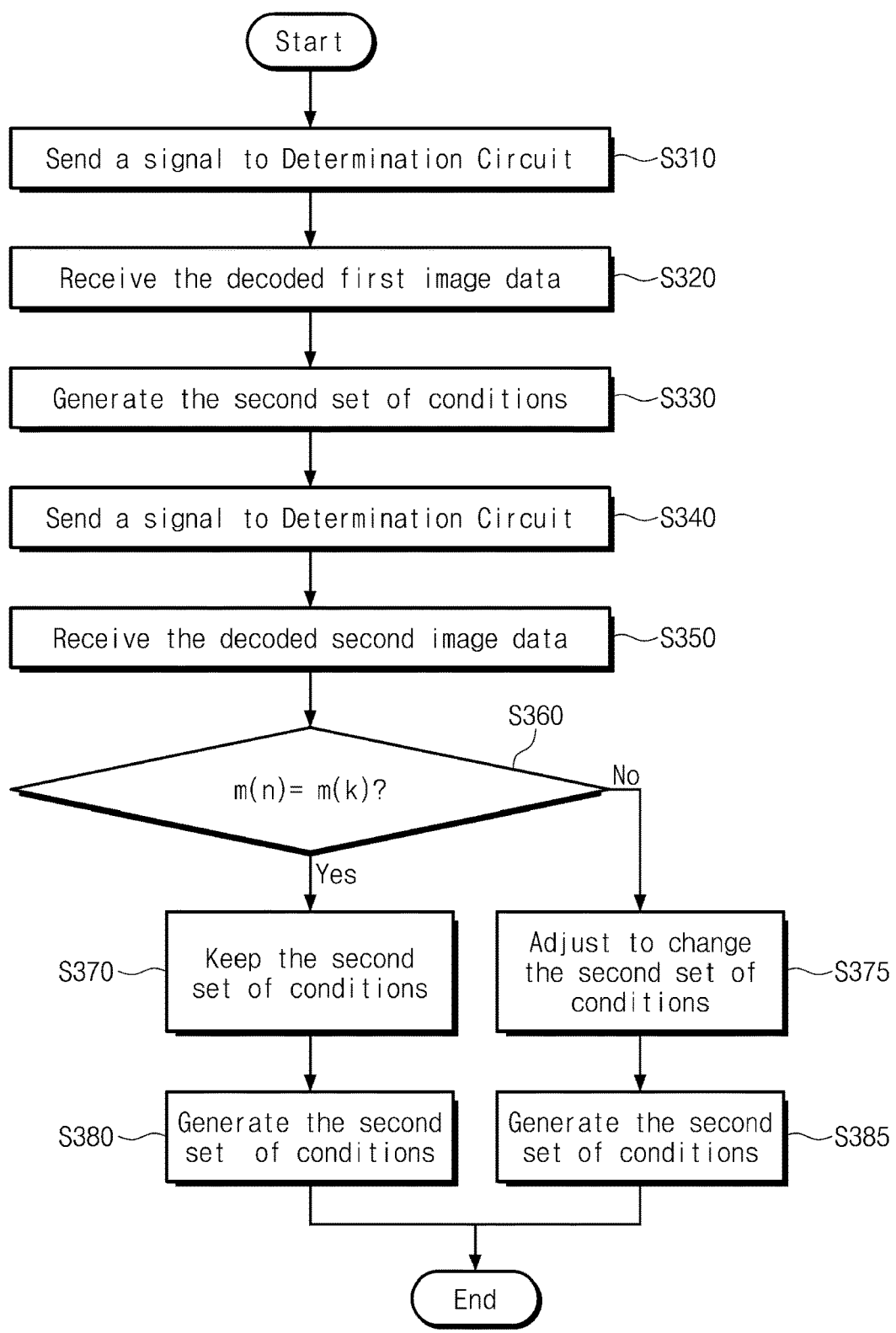
FIG. 14 is a flowchart for describing an operation of an adjusting circuit until an encoding mode of third data is determined after second image data of FIG. 5 are received.

FIG. 14 is a flowchart for describing an operation of an adjusting circuit until an encoding mode of third data is determined after second image data of FIG. 5 are received. For better understanding, FIG. 5 will be referenced together with FIG. 14.

In operation S310, the adjusting circuit 122 outputs the signal s3 to the determination circuit 123. The signal s3 may include information about the first set of conditions c0 (e.g., it may include the first set of conditions c0). The determination circuit 123 may determine an encoding mode of the first image data based on the first set of conditions c0.

In operation S320, the adjusting circuit 122 receives the decoded first image data. The adjusting circuit 122 may identify an encoding mode of the first image data based on the decoded first image data.

In operation S330, the adjusting circuit 122 generates or selects the second set of conditions c1 based on the encoding mode of the second image data and the first set of conditions. Thus, an adjusted set of conditions may be used as the second set of conditions c1.

In operation S340, the adjusting circuit 122 sends the signal s3 to the determination circuit 123. The signal s3 may include information about the second set of conditions c1 (e.g., it may include the second set of conditions c1). The determination circuit 123 may determine an encoding mode of the third image data based on the second set of conditions c1.

In operation S350, the adjusting circuit 122 receives the decoded second image data. The adjusting circuit 122 may identify the encoding mode of the second image data based on the decoded second image data.

In operation S360, the adjusting circuit 122 checks whether the encoding mode of the first image data and the encoding mode of the second image data are identical to each other.

In the case where the encoding mode of the second image data and the encoding mode of the first image data are identical to each other, in operation S370, the adjusting circuit 122 maintains the second set of conditions c1.

In the case where the encoding mode of the second image data and the encoding mode of the first image data are different, in operation S375, the adjusting circuit 122 changes the second set of conditions c1 to the third set of conditions c2.

In operation S380, the adjusting circuit 122 sends the signal s3 to the determination circuit 123. The signal s3 includes information about the second set of conditions c1 (e.g., it may include the second set of conditions c1). The determination circuit 123 determines an encoding mode of the third image data based on the second set of conditions c1.

In operation S385, the adjusting circuit 122 sends the signal s3 to the determination circuit 123. The signal s3 includes information about the third set of conditions c2 (e.g., it may include the third set of conditions c2). The determination circuit 123 determines the encoding mode of the third image data based on the third set of conditions c2.

In some embodiments, the encoding mode determination circuit 120 may be implemented with a hardware circuit (e.g., an analog circuit or a digital/logic circuit) configured to perform the above-described operations. In the embodiments, the hardware circuit of the encoding mode determination circuit 120 may be designed to output intended output values or signals based on given input values or signals.

In some embodiments, the above-described operations of the encoding mode determination circuit 120 may be implemented with a program code of software/firmware, and the encoding mode determination circuit 120 may include a processor core which may execute an instruction set of the program code. In the embodiments, the program code may be written to include information about various numerical values and to provide output values corresponding to given input values.

In some embodiments, the encoding mode determination circuit 120 may be implemented in a hybrid form of hardware and software. In the embodiments, some of operations of the encoding mode determination circuit 120 may be implemented on a hardware circuit, and the remaining operations may be implemented on a processor core. For example, the hardware circuit and the processor core may include a dedicated circuit such as a field programmable gate array (FPGA) or application specific integrated circuits (ASICs).

In some embodiments, information associated with encoding modes and conditions may be stored in a memory element (e.g., a register or a lookup table). The memory element may be included within the encoding mode determination circuit 120 or may be provided on the outside of the encoding mode determination circuit 120. In some embodiments, the information associated with the encoding modes and the conditions may be inserted into the program code, and data of the program code may be stored in the memory element.

According to an embodiment of the inventive concept, a display driver circuit may determine an encoding mode for encoding image data in consideration of an error occurring in the image data. According to an embodiment of the inventive concept, the display driver circuit may prevent an encoding mode of each of a plurality of image data received sequentially and successively from being determined differently due to noise or dither. As a result, a flicker due to the noise or dither may decrease.

While the inventive concept has been described with reference to exemplary embodiments thereof, it will be apparent to those of ordinary skill in the art that various changes and modifications may be made thereto without departing from the spirit and scope of the invention as set forth in the following claims.

What is claimed is:

1. A display driver circuit comprising:
an encoding mode determination circuit configured to select a first encoding mode for encoding first image data based on a first set of conditions; and
an encoder configured to encode the first image data in the first encoding mode,
wherein the encoding mode determination circuit is further configured to
select the first encoding mode for encoding second image data based on a second set of conditions, the second image data being received after the first image data are received,
wherein a second condition in the second set of the conditions corresponding to the first encoding mode includes a wider range of values than a first condition in the first set of the conditions corresponding to the first encoding mode,
wherein the first image data is data for a first image, and the second image data is data for a second image received sequentially after the first image,
wherein the first image data is image data first received after the display driver circuit is reset,
wherein the first set of conditions is a default set after the display drive circuit is reset, and
wherein the encoding mode determination circuit is further configured to generate a conversion value based on the second image data, generate the second set of conditions based on the first set of conditions and the first encoding mode selected for encoding the first image data, and select the first encoding mode for encoding second image data based on the second set of conditions and the conversion value.

2. The display driver circuit of claim 1, wherein the first set of conditions being used for selecting the first encoding mode is updated periodically or randomly.

3. The display driver circuit of claim 1, wherein the conversion value is generated based on pixel values in the second image data.

4. The display driver circuit of claim 3, wherein the display driver circuit is configured to receive the first and second image data from an application processor, and the application processor includes one or more processor cores.

5. The display driver circuit of claim 4, wherein the display driver circuit is configured to receive the first image data from the application processor via a mobile industry processor interface.

6. The display driver circuit of claim 5, wherein the display driver circuit is configured to send image data generated based on the first and second image data to an active matrix organic light-emitting diode display panel.

7. The display driver circuit of claim 5, wherein, a plurality of conditions of the first set of conditions correspond to more than two different encoding modes, respectively.

8. A display driver circuit comprising:
an encoding mode determination circuit configured to:
receive sequentially first image data and second image data,
select a first encoding mode for encoding the first image data based on a first set of conditions, and
select a second encoding mode for encoding the second image data based on a second set of conditions;
an encoder configured to encode the first image data in the first encoding mode, and encode the second image data in the second encoding mode,
wherein a first condition of the first set of conditions corresponds to the first encoding mode,
wherein a second condition of the second set of conditions corresponds to the second encoding mode, and
wherein, in a case where the second encoding mode is identical to the first encoding mode, a range of the second condition is wider than a range of the first condition.

9. The display driver circuit of claim 8, wherein the second set of conditions is adjusted based on the first set of conditions and the first encoding mode selected for encoding the first image.

10. The display driver circuit of claim 8, wherein the encoding mode determination circuit is further configured to:
receive third image data after receiving the first and second image data, and
select a third encoding mode for encoding the third image data based on a third set of conditions,
wherein the encoder is further configured to encode the third image data in the third encoding mode, and
wherein, in a case where the first and second encoding modes are identical to each other, the third set of conditions is identical to the second set of conditions.

11. The display driver circuit of claim 8, wherein the encoding mode determination circuit is further configured to:
generate a conversion value based on pixel values in the second image data, and
select the second encoding mode based on the conversion value and the second set of conditions.

12. The display driver circuit of claim 11, wherein the conversion value is included in a range of the second condition in the second set of conditions.

13. The display driver circuit of claim 8, wherein a difference between the range of the first condition and the range of the second condition is associated with an error value corresponding to the first encoding mode.

14. The display driver circuit of claim 13, wherein the error value is associated with noise occurring in the display driver circuit or dither.

15. A display driver circuit comprising:
an encoding mode determination circuit configured to
determine a first encoding mode for encoding first image data based on a first set of conditions corresponding to encoding modes, the first set of conditions including a first condition, and
determine a second encoding mode for encoding second image data received immediately following the first image data, based on a second set of conditions corresponding to the encoding modes, the second set of conditions including a second condition; and
an encoder configured to encode the first image data in the first encoding mode,
wherein the first condition in the first set of conditions includes a first range or set of criteria, and the second condition in the second set of conditions includes a second range or second set of criteria, wherein the second range is wider than and includes the first range, or the second set of criteria includes the first set of criteria.

16. The display driver circuit of claim 15, further comprising:

a memory configured to store the encoded first image data; and a decoder configured to decode the stored first image data, wherein the encoding mode determination circuit is further configured to:

identify the first encoding mode based on information included in a header of the stored first image data or the decoded first image data.

17. The display driver circuit of claim 15, wherein the encoding mode determination circuit is further configured to:

determine the second encoding mode as an encoding mode different from the first encoding mode in a case where a conversion value obtained from the second image data satisfies a third condition, which is different from the first condition and does not include the first range or set of criteria, from among the conditions in the second set of conditions.

* * * * *